(12) United States Patent
Eguchi et al.

(10) Patent No.: US 7,862,932 B2
(45) Date of Patent: Jan. 4, 2011

(54) CATALYST, ELECTRODE, MEMBRANE ELECTRODE ASSEMBLY AND FUEL CELL

(75) Inventors: Tomoko Eguchi, Yokohama (JP);
Yoshihiko Nakano, Yokohama (JP); Wu Mei, Yokohama (JP); Taishi Fukazawa, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/423,313

(22) Filed: Apr. 14, 2009

(65) Prior Publication Data
US 2009/0202887 A1    Aug. 13, 2009

Related U.S. Application Data

(62) Division of application No. 11/374,325, filed on Mar. 14, 2006, now abandoned.

(30) Foreign Application Priority Data

Mar. 15, 2005    (JP) .............................. 2005-073725

(51) Int. Cl.
*H01M 4/90* (2006.01)
*H01M 8/10* (2006.01)
*B01J 23/52* (2006.01)

(52) U.S. Cl. ..................... 429/231.6; 429/483; 429/486; 429/532; 502/302; 502/303

(58) Field of Classification Search .................... 429/12, 429/27, 40, 208, 209, 231.6, 483, 486, 532; 502/303, 302
See application file for complete search history.

(56) References Cited

U.S. PATENT DOCUMENTS

2003/0091889 A1    5/2003    Sotomura et al.
(Continued)

FOREIGN PATENT DOCUMENTS

JP    7-8797    1/1995
(Continued)

OTHER PUBLICATIONS

Y.Tokura, et al., "Filling Dependence of Electronic Properties on the Verge of Metal-Mott-Insulator Transitions in $Sr_{1-x}La_xTiO_3$", Physical Review Letters, vol. 70, No. 14, Apr. 5, 1993, pp. 2126-2129.
(Continued)

*Primary Examiner*—Wayne Langel
*Assistant Examiner*—Syed Iqbal
(74) *Attorney, Agent, or Firm*—Oblon, Spivak, McClelland, Maier & Neustadt, L.L.P.

(57) ABSTRACT

Disclosed is a catalyst, including a catalyst particle containing at least one component selected from the group consisting of gold, platinum and an gold alloy, the gold alloy containing gold and at least one element selected from transition metal elements of the fourth period, fifth period and sixth period of the Periodic Table, and a catalyst carrier carrying the catalyst particle and containing a perovskite type oxide represented by general formula (1) given below:

$$A_{(1-x)}B_xTiO_y \qquad (1)$$

where the element A is at least one element selected from the group consisting of Ca, Sr and Ba, the element B is at least one element selected from the group consisting of La, Nd, Sm, Eu, Gd, Dy, Ho, Er, Tm, Yb, and Lu, the molar ratio x satisfies $0<x<1$, and the molar ratio y satisfies $2.7 \leq y \leq 3$.

9 Claims, 3 Drawing Sheets

U.S. PATENT DOCUMENTS

2004/0072061 A1* 4/2004 Nakano et al. ............ 429/44
2004/0142230 A1 7/2004 Katori et al.

FOREIGN PATENT DOCUMENTS

| JP | 2001-283865 | 10/2001 |
| JP | 2003-151567 | 5/2003 |
| JP | 2003-308846 | 10/2003 |
| JP | 2004-146223 | 5/2004 |
| JP | 2005-5257 | 1/2005 |
| JP | 2005-34779 | 2/2005 |
| JP | 2005-50759 | 2/2005 |
| JP | 2005-50760 | 2/2005 |
| JP | 2005050760 A * | 2/2005 |
| WO | 03/079470 | 9/2003 |

OTHER PUBLICATIONS

Rodolfo Zanella, et al., "Characterization and reactivity in CO oxidation of gold nanoparticles supported on $TiO_2$ prepared by deposition-precipitation with NaOH and urea", Journal of Catalysis, vol. 222, Issue 2, Mar. 10, 2004, pp. 357-367.

* cited by examiner

CATALYST, ELECTRODE, MEMBRANE ELECTRODE ASSEMBLY AND FUEL CELL

CROSS-REFERENCE TO RELATED APPLICATIONS

This application is a divisional application of U.S. application Ser. No. 11/374,325 filed on Mar. 14, 2006, which is based upon and claims the benefit of priority from prior Japanese Patent Application No. 2005-073725, filed Mar. 15, 2005, the entire contents of which are incorporated herein by reference.

BACKGROUND OF THE INVENTION

1. Field of the Invention

The present invention relates to a catalyst, an electrode, a membrane electrode assembly, and fuel cell.

2. Description of the Related Art

In a fuel cell, a fuel such as hydrogen and methanol is electrochemically oxidized within the cell so as to convert the chemical energy of the fuel directly into an electric energy so as to take out the electric energy. In thermal power generation, $NO_x$ or $SO_x$ is generated by the combustion of the fuel. However, the fuel cell is free from the generation of $SO_x$ or $NO_x$ and, thus, attracts attention as a supply source of a clean electric energy.

In the fuel cell, a catalyst prepared by allowing active metal particles such as particles of platinum, ruthenium or a platinum ally to be carried by a carrier such as a carbon carrier is used in general as the catalyst of the cathode and the anode. Platinum is used as the active catalyst component because platinum exhibits a high oxidizing activity of the fuel and a high reducing activity of oxygen. Also, carbon is used as the carrier of the active catalyst component because carbon is electrically conductive and, thus, is considered to be effective for taking out electrons generated on the surface of the active catalytic metal particle.

For example, Jpn. Pat. Appln. KOKAI Publication No. 2001-283865 discloses a catalyst prepared by allowing a noble metal catalyst such as platinum, palladium, gold, ruthenium, or iridium to be carried by a conductive particle such as carbon black.

The electrode catalyst prepared by allowing platinum to be carried by carbon black exhibits excellent characteristics as described above. However, where the electrode catalyst is prepared by allowing metals other than platinum, e.g., by allowing gold or a gold alloy, to be carried by carbon black, a difficulty is brought about that the power generation efficiency of the fuel cell is lowered. Under the circumstances, it is of high importance to develop a catalyst carrier that can be used in place of carbon black, i.e., a catalyst carrier other than carbon black, which permits carrying gold and a gold alloy in addition to platinum so as to permit the fuel cell to exhibit a high power generation efficiency.

It is disclosed in Jpn. Pat. Appln. KOKAI Publication No. 7-8797 that fine gold particles are fixed to metal oxides containing titanium as the main component such as $TiO_2$, $FeTiO_3$, $CaTiO_3$ and $SrTiO_3$ in order to obtain simply and with a high efficiency an electrode catalyst excellent in the catalytic activity.

However, since the metal oxides disclosed in the publication quoted above are insulating materials, it was impossible for the fuel cell to exhibit an excellent power generation efficiency.

On the other hand, Jpn. Pat. Appln. KOKAI Publication No. 2003-151567 teaches that a perovskite type oxide is used in the air electrode of a fuel cell as a catalyst for catalyzing the decomposing reaction of hydrogen peroxide so as to produce oxygen. The perovskite type oxide noted above includes, for example, $Cu_{x-1}Sr_xTiO_3$ (x=0 to 0.5), $La_xSr_{1-x}MnO_3$ (x=0 to 0.5), and $SrTiO_3$.

Further, Jpn. Pat. Appln. KOKAI Publication No. 2003-308846 discloses an air electrode for a fuel cell. It is taught that the air electrode is formed of a perovskite type oxide. The perovskite type oxide has a general formula of "A(A1A2)$BO_3$", in which a rare earth element is contained in the A1 site, an alkaline earth metal is contained in the A2 site, and cobalt is contained in the B site.

BRIEF SUMMARY OF THE INVENTION

An object of the present invention is to provide a catalyst, an electrode, a membrane electrode assembly, and a fuel cell, which exhibits an excellent power generation efficiency.

According to a first aspect of the present invention, there is provided a catalyst, comprising:

a catalyst particle containing at least one component selected from the group consisting of gold, platinum and an gold alloy, the gold alloy containing gold and at least one element selected from transition metal elements of the fourth period, fifth period and sixth period of the Periodic Table; and a catalyst carrier carrying the catalyst particle and containing a perovskite type oxide represented by general formula (1) given below:

$$A_{(1-x)}B_xTiO_y \quad (1)$$

where the element A is at least one element selected from the group consisting of Ca, Sr and Ba, the element B is at least one element selected from the group consisting of La, Nd, Sm, Eu, Gd, Dy, Ho, Er, Tm, Yb, and Lu, the molar ratio x satisfies $0<x<1$, and the molar ratio y satisfies $2.7 \leq y \leq 3$.

According to another aspect of the present invention, there is provided an electrode comprising a catalyst layer containing a catalyst comprising:

a catalyst particle containing at least one component selected from the group consisting of gold, platinum and an gold alloy, the gold alloy containing gold and at least one element selected from transition metal elements of the fourth period, fifth period and sixth period of the Periodic Table; and a catalyst carrier carrying the catalyst particle and containing a perovskite type oxide represented by general formula (1) given below:

$$A_{(1-x)}B_xTiO_y \quad (1)$$

where the element A is at least one element selected from the group consisting of Ca, Sr and Ba, the element B is at least one element selected from the group consisting of La, Nd, Sm, Eu, Gd, Dy, Ho, Er, Tm, Yb, and Lu, the molar ratio x satisfies $0<x<1$, and the molar ratio y satisfies $2.7 \leq y \leq 3$.

According to another aspect of the present invention, there is provided a membrane electrode assembly, comprising:

a cathode including a cathode catalyst layer;

an anode including an anode catalyst layer; and a proton conductive membrane arranged between the cathode and the anode, wherein at least one of the cathode catalyst layer and the anode catalyst layer contains a catalyst, comprising:

a catalyst particle containing at least one component selected from the group consisting of gold, platinum and an gold alloy, the gold alloy containing gold and at least one element selected from transition metal elements of the fourth period, fifth period and sixth period of the Periodic Table; and a catalyst carrier carrying the catalyst particle and containing a perovskite type oxide represented by general formula (1) given below:

$$A_{(1-x)}B_xTiO_y \tag{1}$$

where the element A is at least one element selected from the group consisting of Ca, Sr and Ba, the element B is at least one element selected from the group consisting of La, Nd, Sm, Eu, Gd, Dy, Ho, Er, Tm, Yb, and Lu, the molar ratio x satisfies $0<x<1$, and the molar ratio y satisfies $2.7 \leq y \leq 3$.

Furthermore, according to another aspect of the present invention, there is provided a fuel cell, comprising:

a cathode including a cathode catalyst layer;

an anode including an anode catalyst layer; and a proton conductive membrane arranged between the cathode and the anode, wherein at least one of the cathode catalyst layer and the anode catalyst layer comprises a catalyst, comprising:

a catalyst particle containing at least one component selected from the group consisting of gold, platinum and an gold alloy, the gold alloy containing gold and at least one element selected from transition metal elements of the fourth period, fifth period and sixth period of the Periodic Table; and a catalyst carrier carrying the catalyst particle and containing a perovskite type oxide represented by general formula (1) given below:

$$A_{(1-x)}B_xTiO_y \tag{1}$$

where the element A is at least one element selected from the group consisting of Ca, Sr and Ba, the element B is at least one element selected from the group consisting of La, Nd, Sm, Eu, Gd, Dy, Ho, Er, Tm, Yb, and Lu, the molar ratio x satisfies $0<x<1$, and the molar ratio y satisfies $2.7 \leq y \leq 3$

DETAILED DESCRIPTION OF THE INVENTION

Various embodiments of the present invention will now be described.

Figure 1:
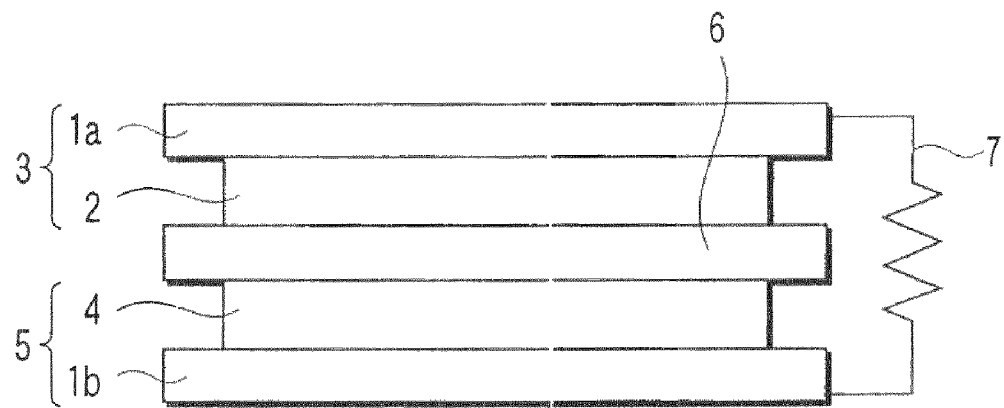
FIG. 1 is a side view schematically showing the construction of a fuel cell according to one embodiment of the present invention.

In the first step, the fuel cell according to one embodiment of the present invention will now be described with reference to FIG. 1. Specifically, FIG. 1 is a side view schematically showing the construction of the fuel cell according to one embodiment of the present invention.

The fuel cell shown in FIG. 1 comprises a membrane electrode assembly (hereinafter referred to as MEA) comprising an anode 3 and a cathode 5, which are stacked one upon the other with a proton conductive membrane 6 interposed therebetween. The anode 3 includes a electrically conductive porous sheet 1a and an anode catalyst layer 2 laminated on the electrically conductive porous sheet 1a. Likewise, the cathode 5 includes a electrically conductive porous sheet 1b and a cathode catalyst layer 4 laminated on the electrically conductive porous sheet 1b. The anode 3 and the cathode 5 are staked one upon the other such that the anode catalyst layer 2 and the cathode catalyst layer 4 are allowed to face each other with the proton conductive membrane 6 interposed therebetween. Further, it is possible for the fuel cell according to an embodiment of the present invention to comprise a fluid flow field plate (not shown) for supplying the fuel and the oxidizing agent to the MEA. Incidentally, a reference numeral 7 shown in FIG. 1 denotes an external circuit.

The fuel cell and the cell reaction will now be described.

A mixed fuel containing methanol and water is supplied from the fluid flow field plate into the catalyst layer 2 of the anode 3. Also, the air (oxygen) acting as an oxidizing agent is supplied into the catalyst layer 4 of the cathode 5. As a result, catalytic reactions represented by chemical formula (2) and chemical formula (3) given below are brought about in each of the catalyst layers 2 and 4:

$$\text{Anode: } CH_3OH + H_2O \rightarrow CO_2 + 6H^+ + 6e^- \tag{2}$$

$$\text{Cathode: } 6H^+ + (3/2)O_2 + 6e^- \rightarrow 3H_2O \tag{3}$$

As apparent from chemical formulas (2) and (3) given above, the protons generated in the anode catalyst layer 2 are migrated into the proton conductive membrane 6. On the other hand, the electrons are migrated into the electrically conductive porous sheet 1a. Also, the electrons supplied from the electrically conductive porous sheet 1b and the protons supplied from the proton conductive membrane 6 are allowed to perform reaction with oxygen in the cathode catalyst layer 4 so as to generate water. By these catalytic reactions, an electric current flows between the pair of the electrically conductive porous sheets 1a and 1b.

Such being the situation, the anode and the cathode are required to exhibit not only the catalytic characteristics for promoting the reaction represented by chemical formula (2) or by chemical formula (3) but also the electric conductive characteristics within the catalyst layer and between the catalyst layer and the electrically conductive porous sheet, and the proton conductive characteristics within the catalyst layer and between the catalyst layer and the proton conductive membrane.

The catalyst for the electrode included in the fuel cell according to an embodiment of the present invention will now be described in the following. The catalyst for the electrode included in the fuel cell comprises a catalyst particle and a catalyst carrier carrying the catalyst particle. The catalyst carrier and the catalyst particle will now be described in detail.

<Catalyst Carrier>

The catalyst carrier comprises a perovskite type oxide represented by general formula (1) given below:

$$A_{(1-x)}B_xTiO_y \tag{1}$$

The element A of the perovskite type oxide represented by formula (1) denotes a divalent element, which is selected from the group consisting of Ca, Sr and Ba, and the element B denotes a trivalent element selected from the group consisting of La, Nd, Sm, Eu, Gd, Dy, Ho, Er, Tm, Yb, and Lu. In terms of cost, it is desirable for the element B to be formed of La.

The molar ratio x in formula (1) satisfies $0<x<1$. If the molar ratio x is 0 or 1, the catalyst carrier exhibits insulating properties, with the result that the electrons generated by the catalytic reaction fail to be migrated vigorously, so that the power generation efficiency of the fuel cell is lowered. It is considered reasonable to understand that the catalyst carrier exhibits insulating properties in the case where the molar ratio x is 0 or 1 because of the situation described in the following.

Where the molar ratio x is 0, the oxide is represented by $ATiO_3$. In this case, Ti is under a positive tetravalent state. Since $Ti^{+4}$ is under the state that electrons are not present on the 3d orbit, an electric current does not flow within the oxide. It follows that the compound $ATiO_3$ is in the form of an insulating compound. On the other hand, where the molar ratio x is 1, the oxide is in the form of $BTiO_3$. In this case, Ti is under a positive trivalent state. In $Ti^{+3}$, a single electron is present on the 3d orbit. It should be noted that $Ti^{+3}$ assumes an especial insulator structure of the Mott insulator. It follows that $BTiO_3$ exhibits insulating properties. Such being the situation, it is considered reasonable to understand that the element A and the element B of the perovskite type oxide are elements for imparting insulating properties to the perovskite type oxide. However, the present inventors have found that it is possible to obtain a conductive oxide, if the element A and the element B are contained in the titanium oxide such that the total molar amount of the element A and the element B is equal to the molar amount of Ti, and if the molar ratio y of formula (1) satisfies $2.7 \leq y \leq 3$. It is considered reasonable to understand that, if the element A and the element B are added together and if the molar ratio y is defined to fall within the range given above, the valency of Ti in the oxide is rendered higher than trivalent and lower than tetravalent, so that it is possible to permit the 3d orbit of Ti to contribute to the migration of electrons and, thus, to obtain the conductive oxide as pointed out above.

It is desirable for the molar ratio x satisfies $0.1 \leq x \leq 0.95$. If the molar ratio x is smaller than 0.1, the construction of the catalyst carrier is rendered close to the construction of the oxide represented by $ATiO_3$. As a result, the conductivity of the oxide tends to be made very low or tends to disappear. On the other hand, if the molar ratio x exceeds 0.95, the construction of the catalyst carrier is rendered close to the construction of the oxide represented by $BTiO_3$. As a result, the conductivity of the oxide tends to be made very low or tends to disappear. It is more desirable for the molar ratio x to satisfy $0.1 \leq x \leq 0.9$. If the molar ratio x falls within this range, it is possible for the perovskite type oxide to produce a particularly excellent conductivity.

The molar ratio y in general formula (1) satisfies $2.7 \leq y \leq 3$. If the molar ratio y falls within this range, it is possible to obtain a perovskite type oxide exhibiting an electric conductivity. Also, the perovskite type oxide is constructed such that an oxygen atom enters and is released from the crystal structure. In order to improve further the characteristics of the fuel cell, it is more desirable for the molar ratio y to satisfy $2.9 \leq y \leq 3$, and furthermore desirably to satisfy $2.95 \leq y \leq 3$.

It is desirable for the catalyst carrier to have an average particle diameter of not smaller than 10 nm to not larger than 1 μm. If the average diameter of the catalyst carrier is smaller than 10 nm, it is difficult to manufacture the catalyst carrier. It is also difficult to handle the manufactured catalyst carrier. On the other hand, if the average particle diameter of the catalyst carrier exceeds 1 μm, the specific surface area of the catalyst carrier is made excessively small, with the result that the electron is unlikely to be migrated between the catalyst carriers.

It is possible to synthesize the perovskite type oxide particles by employing, for example, the solid-solid reaction method, the arc melting method, or the Spark Plasma Sintering (SPS).

<Catalyst Particle>

The catalyst particle contains at least one component selected from the group consisting of gold, a gold alloy and platinum.

Any of gold, a gold alloy and platinum exhibits an excellent catalytic function for activating the cell reaction. It is possible to use singly any of metal gold particles, gold alloy particles and metal platinum particles as the catalyst particles. It is also possible to use in combination a plurality of different kinds of catalyst particles pointed out above.

The gold alloy used in the embodiment of the present invention represents an alloy of a gold element and at least one alloying element selected from transition metal elements of the fourth period, the fifth period and the sixth period of the Periodic Table. To be more specific, the gold alloy used in the embodiment of the present invention includes, for example, an alloy of Au—Pt, Au—Ru, Au—Pt—Ru, Au—Ir, Au—Mo, Au—Fe, Au—Co, Au—Ni, Au—W, Au—Sn and Au—Pt—Re, though the gold alloy used in the embodiment of the present invention is not limited to the alloys exemplified above. Particularly, it is desirable to use Au—Pt alloy, which is excellent in its catalytic activity.

The mixing ratio of the gold element to the alloying element in the gold alloy differs depending on the kind of the alloying element, and it suffices for the alloying element to form a solid solution within the gold alloy. Particularly, it suffices for the alloying element to be contained in the gold alloy in an amount not smaller than 1% by weight and smaller than 100% by weight of the gold alloy. In this case, it is possible for the alloying element to form a solid solution within the gold alloy. In view of the manufacturing cost and the catalytic activity of the resultant catalyst particles, it is desirable for the gold alloy to contain the gold element in an amount of not smaller than 50% to not larger than 99% by weight based on the amount of the gold alloy.

In the case of using metal gold particles, gold alloy particles or a mixture of metal gold particles and gold alloy particles as the catalyst particles, it is desirable for the average particle diameter of the catalyst particles to be not larger than 5 nm. If the average particle diameter of the catalyst particles exceeds 5 nm, the specific surface area of the catalyst particle is excessively small, so that the catalytic activity of the catalyst particles tend to deteriorate. It should be noted that the catalytic activity of the catalyst particles is improved with decrease in the average particle diameter of the catalyst particles. However, it is difficult to manufacture the catalyst particles having an average particle diameter smaller than 0.2 nm. Such being the situation, it is reasonable to set the lower limit of the average particle diameter of the catalyst particles at 0.2 nm. It is more desirable for the average particle diameter of the catalyst particles to fall within not smaller than 0.2 nm to not larger than 3 nm.

In the case of using metal platinum particles as the catalyst particles, it is possible for the average particle diameter of the catalyst particles to be set at not smaller than 0.2 nm to not larger than 10 nm. It is more desirable for the average particle diameter of the catalyst particles to fall within not smaller than 0.2 nm to not larger than 5 nm, furthermore desirably to fall within not smaller than 0.2 nm to not larger than 3 nm.

It is desirable for the catalyst particles to be carried by the catalyst carrier in an amount of not smaller than 5% to not larger than 150% by weight based on the amount of the catalyst carrier. If the amount of the catalyst particles carried by the catalyst carrier is smaller than 5% by weight, the active sites at which the catalyst particles are brought into contact with the mixed fuel or with oxygen is decreased, with the result that it is difficult to obtain a high catalytic activity. The catalytic activity can be enhanced with increase in the amount of the catalyst particles carried by the catalyst carrier, so that it is possible to improve the power generation efficiency of the fuel cell. However, it is difficult to manufacture the catalyst in the case where the catalyst particles are carried by the catalyst carrier in an amount exceeding 150% by weight of the catalyst carrier. It is more desirable for the catalyst particles to be carried by the catalyst carrier in an amount of not smaller than 25% to not larger than 150% by weight of the catalyst carrier.

It is possible to permit the catalyst particles to be carried on the surface of the catalyst carrier by, for example, the method described in the following.

In the first step, the catalyst carrier is suspended in water and, after the suspension is heated to about 70 to 90° C., precursors of the catalyst particles are added to the suspension.

In the case of allowing the gold particles to be carried as the catalyst particles on the surface of the catalyst carrier, it suffices to use, for example, chloroauric acid ($HAuCl_4$), auric chloride, or dimethyl gold acetyl acetonate as the precursor of the catalyst particle. Also, where gold alloy particles are carried as the catalyst particles on the surface of the catalyst carrier, it is possible to use a precursor containing the alloying components in addition to the precursor of the gold particles referred to above. The precursor containing the alloying components includes, for example, chloroplatinic acid, chlororuthenic acid, chloroiridic acid, chlororhodic acid, ferric chloride, cobalt chloride, chromium chloride, gold chloride, silver nitrate, rhodium nitrate, palladium chloride, nickel nitrate, iron sulfate and copper chloride. Further, where metal platinum particles are carried as the catalyst particles on the surface of the catalyst carrier, it is possible to use, for example, chloroplatinic acid, dinitro diamino platinum, platinic chloride, platinous chloride, bisacetyl acetonate platinum, diammine platinum dichloride, tetraammine platinum dichloride and platinum sulfate as the precursor of the metal platinum particles.

If the precursor described above is dissolved in the suspension of the catalyst carrier described above, the suspension can be acidified so as to be converted into an acidic suspension. An alkali is added to the acidified suspension and the suspension is heated appropriately so as to neutralize the acidified suspension. As a result, it is possible to form a metal hydroxide such as $Au(OH)_3$ and to permit the metal hydroxide to be carried on the surface of the catalyst carrier. Further, the suspension is filtered and, then, the filtrate is dried so as to obtain a catalyst carrier carrying the metal hydroxide such as $Au(OH)_3$.

It is possible to apply repeatedly a water washing and the filtration to the catalyst carrier carrying the metal hydroxide thus obtained. By this water washing and the filtration, it is possible to remove the impurity ions produced by the neutralizing reaction described above.

In the next step, the catalyst carrier carrying the metal hydroxide such as $Au(OH)_3$ is put under a reducing atmosphere so as to reduce, for example, $Au(OH)_3$. In this fashion, it is possible to obtain a catalyst carrier carrying the metal particles acting as the catalyst particles on the surface.

It is possible for the reducing atmosphere to be formed of a gaseous atmosphere containing a reducing gas such as hydrogen that is put under a temperature region of 100 to 600° C. If the temperature of the reducing atmosphere exceeds 600° C., the average particle diameter of the metal particles tends to be increased, so that the catalytic activity is lowered. On the other hand, if the temperature of the reducing atmosphere is lower than 100° C., it is possible for the metal particles to be crystallized insufficiently. As a result, when the catalyst is used in the electrode, the average particle diameter of the metal particles tends to be increased. It is more desirable for the temperature of the reducing atmosphere to fall within not lower than 100° C. to not higher than 300° C.

It is desirable for the catalyst to further comprise particles of the oxide of at least one element selected from the transition metal elements of the fourth period, the fifth period and the sixth period of the Periodic Table, said transition metal oxide being carried by at least one of the catalyst particle and the catalyst carrier. To be more specific, if the particle of the transition metal oxide is present in the vicinity of the catalyst particle, the water molecule in the mixed fuel or oxygen atom in the oxidizing agent is attracted to the oxygen defect of the transition metal oxide, so that it is possible to carry out the catalytic reaction with a high efficiency.

The transition metal element forming the transition metal oxide referred to above includes Mn, Co, Zr, Mo, Ru, W and Ir. The particles of the transition metal oxide used in the embodiment of the present invention are the particles of the oxide of at least one element selected from the transition metal elements given above. Also, it is possible for the particles of the transition metal oxide to include particles of the composite oxide containing at least two elements selected from the transition metal elements given above.

It is desirable for the particles of the transition metal oxide to be carried on at least one of the catalyst particle and the catalyst carrier in an amount of not smaller than 1% to not larger than 100% by weight based on the amount of the catalyst particles. If the amount of the particles of the transition metal oxide carried on at least one of the catalyst particle and the catalyst carrier is smaller than 1% by weight, it is difficult to obtain the effect described above. On the other hand, if the carried amount of the particles of the transition metal oxide exceeds 100% by weight of the catalyst particles, the contact area between the catalyst particles and the mixed fuel or the oxidizing agent is decreased, so that the catalytic activity of the catalyst is lowered.

The cathode and the anode, which are the electrodes according to one embodiment of the present invention, will now be described.

<Cathode>

The cathode comprises a catalyst layer. It is desirable for the cathode to comprise further a electrically conductive porous sheet on which the catalyst layer is laminated. The catalyst layer contains a catalyst substance. It is possible for the catalyst layer to contain further a proton conductive material.

It is desirable for the catalyst substance to include the catalyst described above, which is the catalyst for the electrode included in the fuel cell according to the embodiment of the present invention. Where the catalyst, which is for the electrode included in the fuel cell according to the embodiment of the present invention, is contained in the anode, it is acceptable to use the cathode containing a catalyst differing from the catalyst according to the embodiment of the present invention. Particularly, it is desirable for the cathode to contain the catalyst for the electrode included in the fuel cell according to the embodiment of the present invention, in which gold particles, gold alloy particles or a mixture of gold particles and gold alloy particles are contained as the catalyst particles. It should be noted that the catalyst containing the catalyst particles noted above is very low in its reactivity with methanol or is substantially non-reactive with the methanol. Such being the situation, in the case of using the particular catalyst, it is possible to suppress the lowering of the power generation efficiency of the fuel cell that is caused by the methanol cross-over.

The electrically conductive porous sheet (current collector) used in the embodiment of the invention includes, for example, a sheet formed of an air-permeable or a liquid-permeable material such as a carbon cloth or a carbon paper.

It is desirable for the cathode catalyst layer to further contain another conductive substance as a electronic conductor in addition to the catalyst substance noted above.

The electronic conductor used in the embodiment of the present invention is not particularly limited as far as the electronic conductor is formed of a conductive material. For example, it is possible to use a carbon material or a metallic material as the electronic conductor. Particularly, it is desirable to use a carbon material as the electronic conductor in view of the reduction of the manufacturing cost, the mass productivity, and the reduction of the electrode weight. The carbon material used as the electronic conductor includes, for example, carbon particles, a carbon fiber and a carbon nano tube. In the case of using a fibrous conductive substance such as a carbon fiber, it is possible to form an excellent conductive path in the electrode even in the case of decreasing the ratio of the electronic conductor. It is also possible for the particles prepared by covering the surface of an insulating material such as resin with a conductive material to be used as the conductive substance. It should be noted, however, that, since protons are migrated within the electrode during operation of the electrode, the inner region of the electrode is made acidic. Such being the situation, it is desirable to use a material having a high acid-resistant material such as a carbon material or a noble metal material as the conductive material.

Concerning the ratio of the electronic conductor to the catalyst substance, it is desirable to use the electronic conductor in an amount of not lower than 10 parts to not higher than 500 parts by weight relative to 100 parts by weight of the catalyst substance. If the content of the electronic conductor is lower than 10 parts by weight, it is difficult to obtain a sufficiently high conductivity. On the other hand, if the content of the electronic conductor exceeds 500 parts by weight, the ratio of the catalyst substance within the electrode is lowered, so that the catalytic activity is lowered. It is more desirable for the content of the electronic conductor to be not higher than 100 parts by weight relative to 100 parts by weight of the catalyst substance.

It is desirable for the cathode catalyst layer to contain a proton conductive material.

The proton conductive material used in the embodiment of the present invention is not particularly limited as far as the substance permits transmitting the protons. Specifically, the proton conductive material used in the present invention includes, for example, a fluorocarbon resin having a sulfonic acid group, and inorganic materials such as tungstic acid and phosphotungstic acid. To be more specific, the proton conductive material used in the embodiment of the present invention includes, for example, "Nafion" (registered trade mark, manufactured by Du Pont Inc.), "FLEMION" (registered trade mark, manufactured by Asahi Kasei K.K.) and "ACIPLEX" (registered trade mark, manufactured by Asahi Glass K.K.), though the proton conductive material used in the embodiment of the present invention is not limited to the materials exemplified above.

It is possible for the amount of the proton conductive material contained in the cathode catalyst layer to fall within not smaller than 1 part to not larger than 1,000 parts by weight relative to 100 parts by weight of the catalyst substance. If the amount of the proton conductive material is smaller than 1 part by weight, it is difficult to obtain a sufficiently high proton conductivity. On the other hand, if the amount of the proton conductive material exceeds 1,000 parts by weight relative to 100 parts by weight of the catalyst substance, the ratio of the catalyst substance is lowered, so that the catalytic activity is lowered or the ratio of the electronic conductor is lowered, resulting in failure to form a sufficient conductive path. It is more desirable for the amount of the proton conductive material to fall within not smaller than 10 parts to not larger than 200 parts by weight relative to 100 parts by weight of the catalyst substance.

The cathode described above can be manufactured by, for example, the method described in the following.

In the first step, prepared is an electrode composition containing the catalyst substance described above, the conductive substance described above, the proton conductive material described above, water and an organic solvent. It is desirable to prepare the electrode composition by dissolving the proton conductive material in the organic solvent, while dispersing the catalyst substance and the electronic conductor in water, followed by mixing the solution of the proton conductive material with the aqueous dispersion containing the catalyst substance and the electronic conductor.

The proton conductive material is dissolved in the organic solvent because the solubility of the proton conductive material in water is low in general and solubility of the proton conductive material in the organic solvent is high in general. The electrode having the proton conductive material, the catalyst substance and the electronic conductor uniformly dispersed therein can be manufactured by mixing the solution of the proton conductive material with the aqueous dispersion containing the catalyst substance and the electronic conductor. The organic solvent used for dissolving the proton conductive material is not particularly limited as far as the organic solvent is capable of dissolving the proton conductive material. For example, it is possible to use ethanol or 1-propanol as the organic solvent for dissolving the proton conductive material. It is also possible to use a mixture of the organic solvent and water for dissolving the proton conductive material. The catalyst substance and the electronic conductor can be dispersed in water by using, for example, a known dispersing device such as a homogenizer.

The cathode catalyst layer is manufactured by removing water and the organic solvent by, for example, volatilization from the electrode composition thus obtained. The cathode can be manufactured by laminating the cathode catalyst layer thus obtained on a electrically conductive porous sheet.

The manufacturing method of the cathode is not limited to the method described above, and the cathode can be manufactured by another method.

For example, the cathode can be manufactured as follows. Specifically, a electrically conductive porous sheet is used as a support member. In this case, a suspension prepared by dispersing the catalyst substance and the electronic conductor in water is filtered through the support member, followed by drying the filtrate remaining on the support member. Then, the support member supporting the filtrate is impregnated with an organic solvent dissolving the proton conductive material, followed by volatilizing the organic solvent, thereby obtaining the desired cathode.

Alternatively, it is also possible to mix uniformly the dispersion prepared by dispersing the catalyst substance and the electronic conductor in water with an organic solvent dissolving the proton conductive material, followed by coating a electrically conductive porous sheet with the mixture and subsequently drying the electrically conductive porous sheet coated with the mixture, thereby obtaining the desired cathode.

<Anode>

The anode comprises a catalyst layer. Also, it is possible for the anode to comprise a electrically conductive porous sheet on which the catalyst layer is laminated. The catalyst layer contains a catalyst substance. It is possible for the catalyst layer to further contain a proton conductive material.

The catalyst substance contained in the catalyst layer includes, for example, the catalyst for the electrode included in the fuel cell according to the embodiment of the present invention, and the catalyst prepared by allowing anode catalyst particles of the catalytic metal such as platinum and ruthenium to be carried by an anode catalyst carrier mainly containing a carbon material such as carbon particles or a carbon fiber. In the case of using the catalyst for the electrode included in the fuel cell according to the embodiment of the present invention, it is desirable to use platinum particles as the catalyst particles. One kind of the catalyst noted above can be used as the catalyst substance. Alternatively, a plurality of different kinds of the catalysts noted above can be used in combination as the catalyst substance.

For preparing the anode, it is possible to use the electrically conductive porous sheet equal to that described previously in conjunction with the cathode.

It is possible for the catalyst layer of the anode to contain another conductive substance as the electronic conductor in addition to the catalyst substance.

For preparing the catalyst layer of the anode, it is possible to use the electronic conductor and the proton conductive material equal to those described previously in conjunction with the cathode. Also, it is possible for the amounts of the electronic conductor and the proton conductive material contained in the catalyst layer to be equal to those described previously in conjunction with the cathode. The reasons for setting the amounts of the electronic conductor and the proton conductive material as noted above are equal to those described previously in conjunction with the cathode.

The manufacturing method of the anode is equal to those described previously in conjunction with the cathode.

The membrane electrode assembly (MEA) according to an embodiment of the present invention comprises the cathode described above, the anode described above, and the proton conductive membrane arranged between the cathode and the anode.

It is possible to use a sheet formed of a material similar to the proton conductive material described previously as the proton conductive membrane. To reiterate, it is possible to use a sheet formed of a fluorocarbon based resin having a sulfonic acid group, tungstic acid or phosphotungstic acid as the proton conductive membrane.

Figure 2:
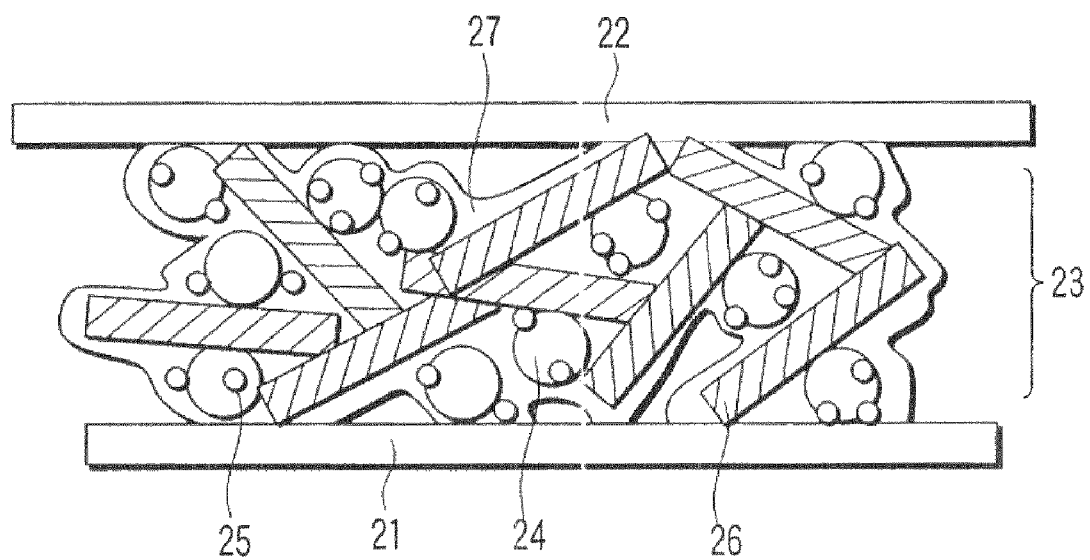
FIG. 2 is a side view schematically showing the construction of the cathode and the proton conductive membrane included in the membrane electrode assembly according to one embodiment of the present invention.

The MEA (membrane electrode assembly) according to one embodiment of the present invention will now be described with reference to FIG. 2. Specifically, FIG. 2 is a side view schematically showing the construction of the cathode and the proton conductive membrane included in the MEA according to one embodiment of the present invention. As shown in the drawing, a cathode catalyst layer 23 is formed between a electrically conductive porous sheet 21 and a proton conductive membrane 22. A catalyst carrier 24 is contained in the cathode catalyst layer 23. Catalyst particles 25 are carried on the surface of the catalyst carrier 24. Also, a conductive substance 26 is contained as a electronic conductor in the cathode catalyst layer 23. A proton conductive material 27 is present in at least a part of the clearance between the catalyst carrier 24 and the conductive substance 26. The proton conductive material 27 serves to bind the catalyst carriers 24 to each other, to bind the conductive substances 26 to each other and to bind the catalyst carrier 24 to the conductive substance 26. The proton conductive material 27 is also present in at least a part of the clearance between the cathode catalyst layer 23 and the electrically conductive porous sheet 21 and in the clearance between the cathode catalyst layer 23 and the proton conductive membrane 22. The proton conductive material 27 also serves to bind the cathode catalyst layer 23 to the electrically conductive porous sheet 21 and to bind the cathode catalyst layer 23 to the proton conductive membrane 22. This is also the case with the side of the anode.

The MEA according to the embodiment of the present invention can be manufactured, for example, as follows.

Specifically, the MEA can be manufactured by the press bonding of the anode described above and the cathode described above with the proton conductive membrane interposed therebetween. In applying the press bonding, the anode and the cathode are arranged such that the catalyst layers thereof are allowed to face each other.

For applying the press bonding, the temperature is set to fall within not less than 100° C. to not more than 180° C., and the applied pressure falls within not less than 10 kg/cm$^2$ to not more than 200 kg/cm$^2$. It suffices to carry out the thermocompression bonding for about 1 to 30 minutes under the conditions given above.

It is possible for a fuel cell according to an embodiment of the present invention to comprise a fluid flow field plate for supplying the fuel and the oxidizing agent to the MEA in addition to the MEA described above. It is possible for a single MEA or a plurality of MEA's to be included in the fuel cell. In the case of using a plurality of MEA's, it is possible to obtain a desired electromotive force.

As described previously, the catalyst for the electrode included in the fuel cell according to the embodiment of the present invention comprises a catalyst particle containing at least one component selected from the group consisting of gold, platinum and an gold alloy, the gold alloy containing gold and at least one element selected from transition metal elements of the fourth period, fifth period and sixth period of the Periodic Table, and a catalyst carrier carrying the catalyst particle and containing a perovskite type oxide represented by general formula (1) given previously. The particular construction of the catalyst makes it possible to realize a fuel cell exhibiting an excellent power generation efficiency.

It should be noted in this connection that, in the case of using carbon black as the catalyst carrier and using gold particles or gold alloy particles as the catalyst particles as in Jpn. Pat. Appln. KOKAI Publication No. 2001-283865 referred to previously, it is impossible to obtain a catalyst exhibiting an excellent catalytic activity because the metal particles are aggregated, so that it was impossible for the metal particles to be carried sufficiently on the surface of the carbon black. However, in the case of using a perovskite type oxide represented by formula (1) given previously as the catalyst carrier as in the present invention, the gold particles or the gold alloy particles can be carried sufficiently on the surface of the catalyst carrier without aggregation of the gold particles or the gold alloy particles. What should also be noted is that the catalyst carrier specified in the present invention exhibits an excellent electric conductivity. Such being the situation, in the case of using gold particles or the gold alloy particles as the catalyst particles, it is possible to obtain a catalyst exhibiting a high catalytic activity and a high conductivity with a low manufacturing cost. In addition, in the case of using the perovskite type oxide carrier, the catalyst exhibits an excellent catalytic activity even in the case of using platinum particles as the catalyst particles. As a result, it is possible to provide a catalyst exhibiting an excellent catalytic activity and an excellent conductivity in the case of using any of the gold particles, the gold alloy particles and the platinum particles as the catalyst particles. Thus, the catalyst according to the embodiment of the invention makes it possible to realize a fuel cell exhibiting an excellent power generation efficiency.

Particularly, the catalyst using gold particles or gold alloy particles as the catalyst particles is excellent in the oxygen reducing activity and is substantially free from the methanol oxidizing activity, or the methanol oxidizing activity of the catalyst is very low. It follows that, in the case of using as the cathode catalyst the catalyst including gold particles or gold alloy particles as the catalyst particles, it is possible to improve the reactivity of the cathode reaction. It is also possible to suppress the lowering of the power generation efficiency caused by the methanol cross-over. Naturally, it is possible to improve the output characteristics of the fuel cell.

Examples of the present invention will now be described with reference to the accompanying drawings.

EXAMPLE 1

Preparation of Catalyst

In the first step, a perovskite type oxide of $Sr_{0.9}Nd_{0.1}TiO_3$, which is used as the catalyst carrier, was prepared as follows.

Specifically, mixed were $SrCO_3$ (compound A shown in Table 1), which was manufactured by Rare Metallic Inc., and $TiO_2$, which was manufactured by High Purity Chemical Inc., in a stoichiometric ratio, followed by provisionally burning the mixture at 1,100° C. for 10 hours under the air atmosphere. Then, the mixture was mixed again, followed by formally burning the mixture for 10 hours so as to obtain $SrTiO_3$. Further, $SrTiO_3$ was mixed with $Nd_2O_3$ (compound B shown in Table 1), which was manufactured by High Purity Chemical Inc., $TiO_2$ and Ti, which was manufactured by High Purity Chemical Inc., in a stoichiometric ratio, followed by provisionally burning the mixture at 1,500° C. for 8 hours while allowing 5% $H_2$/Ar gas to flow into the burning system. Further, the mixture was mixed again, followed by formally burning the mixture at 1,600° C. for 5 hours under the same atmosphere so as to obtain a catalyst carrier of $Sr_{0.9}Nd_{0.1}TiO_3$.

In the next step, the catalyst carrier of $Sr_{0.9}Nd_{0.1}TiO_3$ thus obtained was pulverized in a ball mill for 24 hours so as to improve the dispersion capability of the catalyst carrier in water. A suspension was prepared by dispersing 0.6 g of the catalyst carrier of $Sr_{0.9}Nd_{0.1}TiO_3$ in 1,000 mL of water by using a homogenizer and an ultrasonic cleaner.

The suspension thus prepared was put in a four-mouth flask equipped with a mechanical stirrer, a reflux condenser, and a liquid-circulating pump. While stirring the suspension at 80° C., a precursor solution of gold particles and a precipitant were dripped simultaneously into the suspension. Each of the precursor solution and the precipitant was dripped at a rate of 50 mL/hour. The precursor solution of the gold particles was prepared by diluting 14.3 mL of an aqueous solution of chloroauric acid manufactured by Wako Junyaku Kogyo K.K., which contained 42 mg/mL of Au, with 400 mL of water. On the other hand, 400 mL of an aqueous solution containing 0.05 M of $NaHCO_3$, which was manufactured by Kanto Kagaku K.K., was used as the precipitant. The pH value of the suspension was controlled at 7 to 8 during dripping of the precursor solution of gold particles and the precipitant into the suspension. By these treatments, the precursor of the gold particles was converted into $Au(OH)_3$, which was carried on the surface of the catalyst carrier.

The suspension was filtered and, then, the filtrate was dried in a dryer at 50° C., followed by reducing the dried filtrate at 180° C. for one hour while allowing a 95% $H_2$/Ar gas to flow into the reducing system, thereby converting $Au(OH)_3$ into Au. As a result, obtained was a catalyst for the electrode included in a fuel cell, comprising the catalyst carrier of $Sr_{0.9}Nd_{0.1}TiO_3$ and the gold particles carried on the surface of the catalyst carrier. The gold particles were carried on the surface of the catalyst carrier in an amount of 100 parts by weight based on 100 parts by weight of the catalyst carrier.

The surface of the catalyst thus obtained was observed with a transmission electron microscope (TEM manufactured by Nippon Denshi K.K.). The TEM photo (magnification of 200,000) showing the surface of the catalyst is given in FIG. 3.

Figure 3:
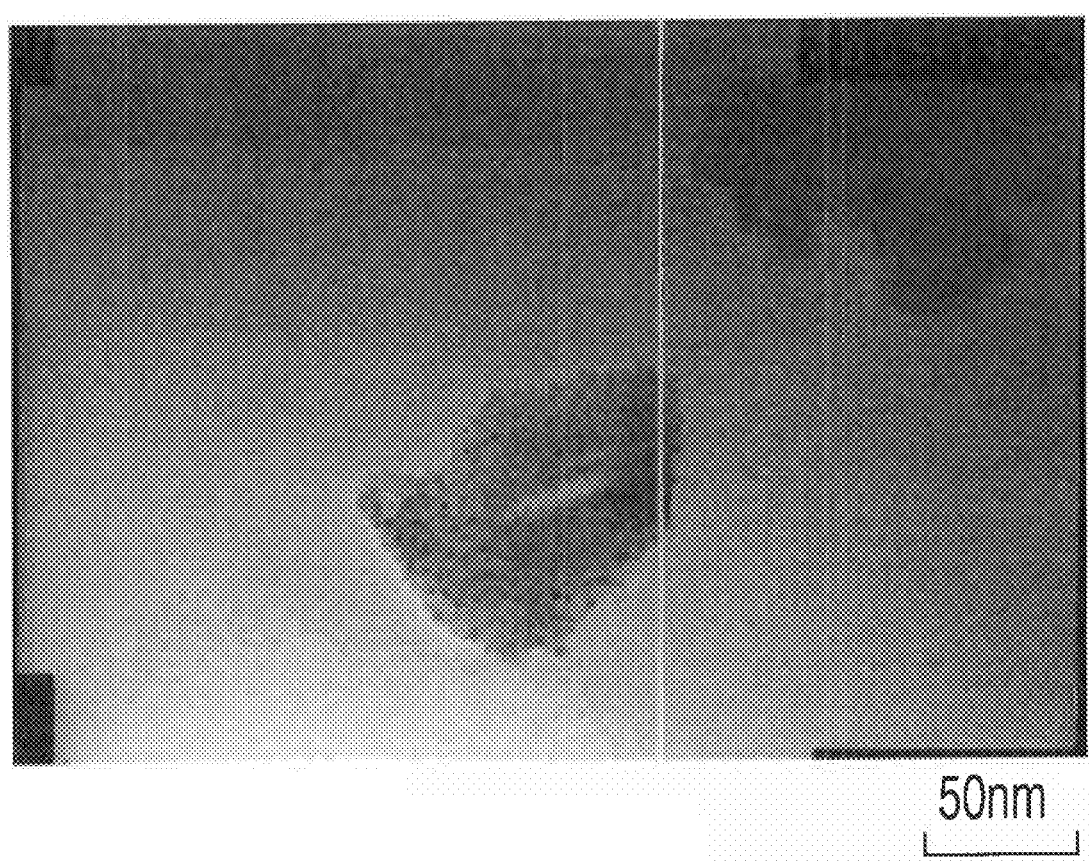
FIG. 3 is a transmission electron micrograph showing the result of observation of the surface of the catalyst for Example 1 of the present invention described herein later.

As is apparent from FIG. 3, it has been confirmed that obtained was a catalyst having gold particles (catalyst particles) carried on the surface of the catalyst carrier.

The average particle diameter of each of the catalyst carrier and the catalyst particles of the catalyst thus obtained were measured as described in the following.

Specifically, the particle diameter of the catalyst carrier was measured by selecting at random a single catalyst carrier whose entire contour could be observed in respect of 10 fields of view of the transmission electron micrograph observed as in FIG. 3. The average value of the particle diameters of these 10 catalyst carriers was regarded as the average particle diameter of the catalyst carriers. Also, the particle diameter of the catalyst particle was measured by selecting at random 5 catalyst particles whose entire contour could be observed from the catalyst particles carried on each of the 10 catalyst carriers thus selected. The average value of the particle diameters of these 50 catalyst particles was regarded as the average particle diameter of the catalyst particles.

As a result, the average particle diameter of the catalyst carriers was found to be 100 nm and the average particle diameter of the catalyst particles was found to be 2 nm.

Further, the oxygen reducing activity of the catalyst thus obtained was measured as follows.

Specifically, a sample was prepared by mixing 50 parts by weight of a carbon paste manufactured by BAS K.K. with 100 parts by weight of the catalyst thus obtained. The oxygen reducing activity of the catalyst was examined by applying a CV (Cyclic Voltammetry) measurement described in the following to the sample thus prepared.

Figure 4:
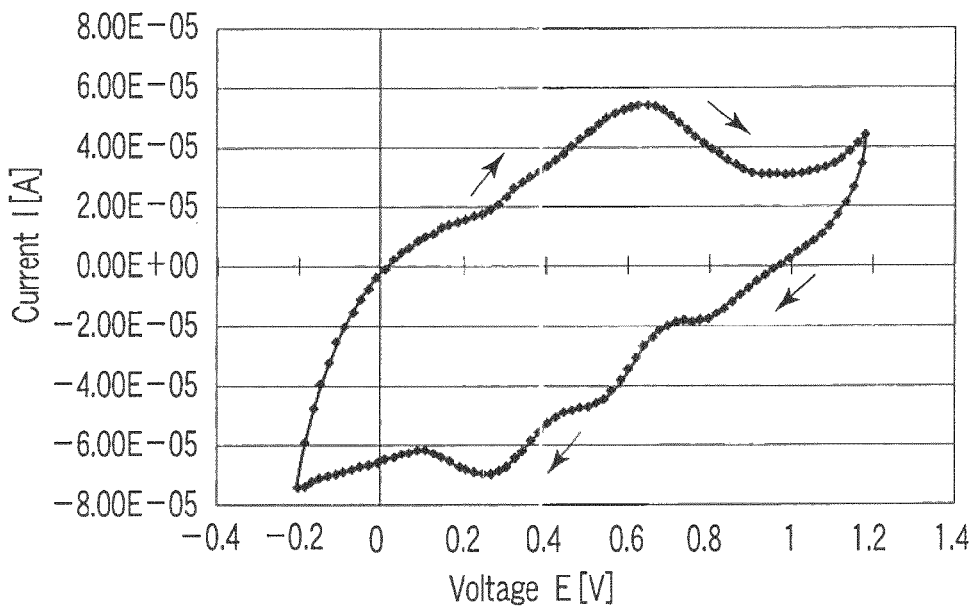
FIG. 4 is a graph showing the result of the CV measurement of the catalyst for Example 1 of the present invention.

Specifically, a functional electrode was prepared by filling a columnar void having a diameter of about 1.5 mm and a height of about 3 mm with the sample. The counter electrode was formed of Pt. Further, a saturated calomel electrode was used as the reference electrode. The measurement was performed in the three electrodes system, in which the functional electrode, counter electrode and reference electrode described above were used. And, the measurement was performed while bubbling oxygen within 0.5 M of $H_2SO_4$. FIG. 4 is a graph showing the result. In the graph of FIG. 4, voltage (V) is plotted on the abscissa, and current (A) is plotted on the ordinate. In the graph of FIG. 4, the current value is shown in terms of the current per mg of the gold particles (catalyst particles). Also, the arrows shown in FIG. 4 denote the scanning direction. The absolute value of the current value, which is converted into the current value per mg of the catalyst particles, under 0.3 V when scanned from the high potential side toward the low potential side is shown in Table 1 as the CV measurement current value.

<Preparation of Cathode>

A cathode was prepared as follows by using the catalyst obtained as described above.

Specifically, 110 mg of the catalyst and 60 mg of a carbon fiber used as a electronic conductor were dispersed in 150 mL of water by using a homogenizer and an ultrasonic cleaner so as to obtain a suspension. The suspension thus obtained was heated and filtered through a electrically conductive porous sheet formed of a carbon paper TGP-H-120 manufactured by Toray Inc. and having an average thickness of 380 μm, followed by drying the filtrate. Then, the electrically conductive porous sheet supporting the dried filtrate was impregnated with an organic solvent prepared by mixing 1-propanol, ethanol and water, and dissolving 4% of "Nafion", which is a registered trade mark of a fluorocarbon resin having a sulfonic acid group, which is manufactured by Du Pont Inc. Nafion noted above was used as a proton conductive material. Then, the electrically conductive porous sheet supporting the filtrate was further impregnated with the organic solvent dissolving 6% of Nafion, followed by volatilizing the organic solvent and water so as to manufactured a cathode. The catalyst layer included in the electrode thus manufactured was found to have a thickness of 194 μm. Also, 47 mg of Nafion was contained in the electrode.

<Preparation of Anode>

Prepared as the catalysts were 60 mg of carbon particles having platinum and ruthenium metal carried thereon and 68 mg of a carbon fiber having platinum and ruthenium metal carried thereon. These catalysts were dispersed in 150 mL of water by using a homogenizer and an ultrasonic cleaner. The suspension was heated and filtered through a electrically conductive porous sheet formed of a carbon paper TGP-H-120 manufactured by Toray Inc. and having an average thickness of 380 μm, followed by drying the filtrate. Then, the electrically conductive porous sheet supporting the dried filtrate was impregnated with the organic solvent dissolving 6% of Nafion equal to that used for preparation of the cathode described above, followed by volatilizing the solvent so as to manufacture the anode. The thickness of the catalyst layer of the electrode thus manufactured was found to be 121 μm. Also, the electrode was found to contain 40 mg of Nafion.

<Preparation of MEA>

A sheet of fluorocarbon resin (Nafion 117 manufactured by Du Pont Inc.) having a thickness of 200 μm, the fluorocarbon resin having a sulfonic acid group, was used as the proton conductive membrane. The MEA (membrane electrode assembly) was manufactured by applying a thermocompression bonding at 125° C. for 5 minutes under a pressure of 100 kg/cm$^2$ to a laminate structure comprising the cathode and the anode, which were positioned such that the catalyst layers thereof were positioned to face each other with the proton conductive membrane interposed therebetween. The MEA thus manufactured was subjected to a boiling treatment for one hour within a distilled water.

<Assembling of Fuel Cell>

A unit cell of a liquid transfer type fuel cell was assembled by having the MEA thus manufactured sandwiched between fluid flow field plates.

The performance of the electromotive section of the fuel cell thus obtained was evaluated. The cell performance was measured under the conditions given below.

Figure 5:
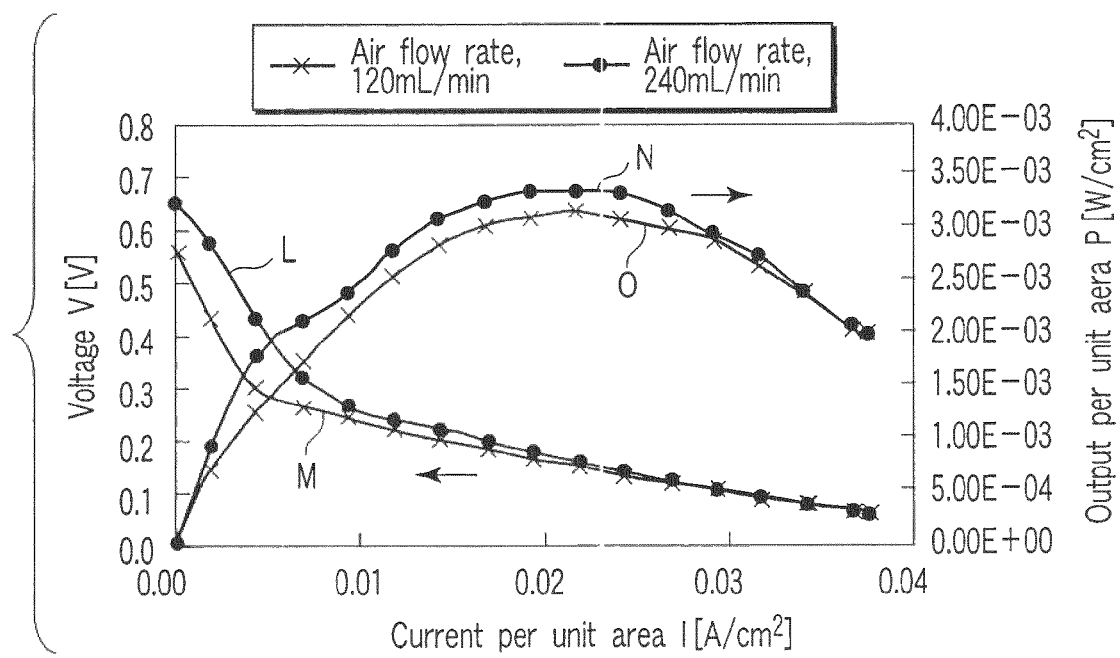
FIG. 5 is a graph showing the result of the measurement of the current-voltage characteristics of the fuel cell for Example 1 of the present invention.

Specifically, a 1M of methanol solution was supplied as the fuel into the anode at a flow rate of 0.6 mL/min. Also, the air used as the oxidizing agent was supplied into the cathode at a flow rate of 120 mL/min or 240 mL/min. Under these conditions, the current-voltage characteristics were measured under the temperature of 70° C., with the result as shown in the graph of FIG. 5. The current per unit area (A/cm$^2$) is plotted on the abscissa of the graph, and the voltage (V) and the output per unit area (W/cm$^2$) are plotted on the ordinates on the left side and right side of the graph. The line L in the graph denotes the relationship between the current and the voltage in the case where the air was supplied to the cathode at a flow rate of 240 mL/min. On the other hand, the line M in the graph denotes the relationship between the current and the voltage in the case where the air was supplied to the cathode at a flow rate of 120 mL/min. The line N in the graph denotes the relationship between the current and the output in the case where the air was supplied to the cathode at a flow rate of 240 mL/min. Further, the line O denotes the relationship between the current and the output in the case where the air was supplied to the cathode at a flow rate of 120 mL/min. Table 1 shows the maximum output per unit area in the case where the air was supplied to the cathode at a flow rate of 120 mL/min.

As is apparent from FIG. 5, the fuel cell was found to be excellent in the output characteristics and the power generation efficiency in the case of supplying the air to the cathode at a flow rate of 120 mL/min as in the case of supplying the air to the cathode at a flow rate of 240 mL/min.

EXAMPLES 2 TO 10

Various kinds of catalyst carriers as shown in Table 1 were obtained as in Example 1, except that the kinds of the compounds B were changed as shown in Table 1 and the mixing ratios of the compounds B were changed. Then, catalysts for the electrodes included in the fuel cells were manufactured as in Example 1, except that used were the catalyst carriers noted above. The surface of the catalyst thus manufactured was observed with a TEM, with the result that the gold particles (catalyst particles) were found to have been carried on the surface of the catalyst carrier. The average particle diameter of the catalyst particles was found to be 2 nm, and the average particle diameter of the catalyst carriers was found to be 100 nm. The CV measurement was applied to the catalysts thus manufactured as in Example 1. Table 1 also shows the results as in Example 1.

Then, cathodes were manufactured as in Example 1, except that used were the catalysts described above. Then, a fuel cell was assembled as in Example 1, except that the cathode thus manufactured was used for assembling the fuel cell. The current-voltage characteristics of the fuel cell thus assembled were measured as in the measurement of the current-voltage characteristics of the fuel cell for Example 1. Table 1 also shows the maximum output per unit area, covering the case where the air was supplied to the cathode at a flow rate of 120 mL/min.

EXAMPLE 11

SrTiO$_3$ obtained as in Example 1, La$_2$O$_3$ used as compound B, TiO$_2$ and Ti were mixed in a stoichiometric ratio and, then, the mixture was sintered with SPS at 1170° C. so as to obtain the catalyst carrier of the kind shown in Table 1. Then, catalysts for the electrodes included in the fuel cells were manufactured as in Example 1, except that used were the catalyst carriers noted above. The surface of the catalyst thus manufactured was observed with a TEM, with the result that the gold particles (catalyst particles) were found to have been carried on the surface of the catalyst carrier. The average particle diameter of the catalyst particles was found to be 2 nm, and the average particle diameter of the catalyst carriers was found to be 100 nm. The CV measurement was applied to the catalysts thus manufactured as in Example 1. Table 1 also shows the results as in Example 1.

Then, cathodes were manufactured as in Example 1, except that used were the catalysts described above. Then, a fuel cell was assembled as in Example 1, except that the cathode thus manufactured was used for assembling the fuel cell. The current-voltage characteristics of the fuel cell thus assembled were measured as in the measurement of the current-voltage characteristics of the fuel cell for Example 1. Table 1 also shows the maximum output per unit area, covering the case where the air was supplied to the cathode at a flow rate of 120 mL/min.

EXAMPLES 12 TO 33

Various kinds of catalyst carriers shown in Table 1 were obtained as in Example 1, except that the kinds of compounds A and compounds B were changed as shown in Table 1 and the mixing ratios of the compounds A and B were changed. Then, catalysts for the electrodes included in the fuel cells were manufactured as in Example 1, except that used were the catalyst carriers noted above. The surface of the catalyst thus manufactured was observed with a TEM, with the result that the gold particles (catalyst particles) were found to have been carried on the surface of the catalyst carrier. The average particle diameter of the catalyst particles was found to be 2 nm, and the average particle diameter of the catalyst carriers was found to be 100 nm. The CV measurement was applied to the catalysts thus manufactured as in Example 1. Table 1 also shows the results as in Example 1.

Then, cathodes were manufactured as in Example 1, except that used were the catalysts described above. Then, a fuel cell was assembled as in Example 1, except that the cathode thus manufactured was used for assembling the fuel cell. The current-voltage characteristics of the fuel cell thus assembled were measured as in the measurement of the current-voltage characteristics of the fuel cell for Example 1. Table 1 also shows the maximum output per unit area, covering the case where the air was supplied to the cathode at a flow rate of 120 mL/min.

EXAMPLE 34

A catalyst for the electrode included in a fuel cell, which comprised a catalyst carrier and gold-platinum alloy particles carried on the surface of the catalyst carrier, was manufactured as described in the following.

In the first step, a catalyst carrier of $Sr_{0.9}Nd_{0.1}TiO_3$ that was obtained as in Example 1 was pulverized in a ball mill for 24 hours in order to improve the dispersion capability of the catalyst carrier in water. Then, 0.6 g of the pulverized catalyst carrier was dispersed in 1,000 mL of water by using a homogenizer and an ultrasonic cleaner so as to prepare a suspension.

The suspension was put in a four-mouth flask equipped with a mechanical stirrer, a reflux condenser and a liquid-circulating pump. While stirring the suspension at 80° C., a precursor solution of platinum particles was dripped into the suspension at a rate of 30 mL/hour. Also, a precipitant was dripped simultaneously into the suspension at a rate of 50 mL/hour. The precursor solution of the platinum particles was prepared by diluting 1.4 mL of an aqueous solution of chloroplatinic acid containing 42 mg/mL of platinum with 30 mL of water. An aqueous solution of 0.01M of $NaHCO_3$ in an amount of 30 mL was used as the precipitant. The dripping was controlled to permit the pH value of the suspension to be kept at 4 to 6. As a result, the precursor of the platinum particles were converted into $Pt(OH)_4$, which was carried on the surface of the catalyst carrier.

After the suspension was filtered, the filtrate was dried at 50° C. in a dryer, followed by dispersing the dried filtrate in 1,000 mL of water by using a homogenizer and an ultrasonic cleaner so as to prepare a suspension. The suspension thus prepared was put in a four-mouth flask similar to that referred to previously. Then, a precursor solution of gold particles and the precipitant were dripped simultaneously into the suspension containing the catalyst carrier carrying $Pt(OH)_4$ while stirring the suspension at 80° C. Each of the precursor solution of the gold particles and the precipitant was dripped at a rate of 50 mL/hour. The precursor solution of the gold particles was prepared by diluting 12.8 mL of an aqueous solution of chloroauric acid containing 42 mg/mL of Au, with 200 mL of water. On the other hand, 200 mL of an aqueous solution of 0.05M of $NaHCO_3$ was used as the precipitant. In this case, the addition amount of the precursor of the gold particles was determined so as to obtain Au—Pt alloy particles containing 90% by weight of Au. The dripping was controlled to permit the pH value of the suspension to be kept at 7 to 8. As a result, the precursor of the gold particles was converted into $Au(OH)_3$, which was carried on the surface of the catalyst carrier.

After the suspension was filtered, the filtrate was dried at 50° C. within a dryer and reduced at 300° C. for one hour while allowing a 95% $H_2$/Ar gas to flow into the reducing system, there by forming a Au—Pt alloy from $Au(OH)_3$ and $Pt(OH)_4$. In this fashion, obtained was a catalyst for the electrode included in a fuel cell, the catalyst comprising 100 parts by weight of the catalyst carrier of $Sr_{0.9}Nd_{0.1}TiO_3$ and 100 parts by weight of the Au—Pt alloy particles carried on the catalyst carrier.

The surface of the catalyst thus obtained was observed with a TEM as in Example 1, as a result of which it has been confirmed that it was possible to obtain a catalyst comprising a catalyst carrier and the Au—Pt alloy particles (catalyst particles) carried on the surface of the catalyst carrier. The average particle diameter of the catalyst particles was found to be 2 nm, and the average particle diameter of the catalyst carrier was found to be 100 nm. The CV measurement was applied to the catalyst thus obtained as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

EXAMPLES 35 TO 42

Various catalyst carriers as shown in Table 1 were obtained as in Example 34, except that the kinds of compound A and compound B were changed as shown in Table 1 for preparing the catalyst carriers and that the mixing ratios of these compounds A and B were changed. Catalysts for the electrode included in the fuel cell were manufactured as in Example 34, except that used were the catalyst carriers thus obtained.

The surface of the catalyst thus obtained was observed with a TEM as in Example 1, as a result of which it has been confirmed that it was possible to obtain a catalyst comprising a catalyst carrier and the Au—Pt alloy particles (catalyst particles) carried on the surface of the catalyst carrier. The average particle diameter of the catalyst particles was found to be 2 nm, and the average particle diameter of the catalyst carrier was found to be 100 nm. The CV measurement was applied to the catalyst thus obtained as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

EXAMPLE 43

A catalyst for the electrode included in a fuel cell was manufactured as follows.

In the first step, the catalyst carrier of $Sr_{0.9}Nd_{0.1}TiO_3$ that was obtained as in Example 1 was pulverized in a ball mill for 24 hours in order to improve the dispersion capability of the catalyst carrier in water. Then, 0.6 g of the pulverized catalyst carrier was dispersed in 1,000 mL of water by using a homogenizer and an ultrasonic cleaner so as to prepare a suspension.

The suspension was put in a four-mouth flask equipped with a mechanical stirrer, a reflux condenser and a liquid-circulating pump. While stirring the suspension at 80° C., a precursor solution of the gold particles and a precipitant were dripped simultaneously into the suspension at a rate of 50 mL/hour for each of the precursor solution of the gold particles and the precipitant. The precursor solution of the gold particles was prepared by diluting 11.4 mL of an aqueous solution of chloroauric acid containing 42 mg/mL of Au with 150 mL of water. On the other hand, an aqueous solution of 0.05M of $NaHCO_3$ in an amount of 150 mL was used as the precipitant. The dripping was controlled to permit the pH value of the suspension to be kept at 7 to 8. As a result, the precursor of the gold particles were converted into $Au(OH)_3$, which was carried on the surface of the catalyst carrier.

After the suspension was filtered, the filtrate was dried at 50° C. in a dryer, followed by reducing the dried filtrate at 180° C. for one hour while allowing a 95% $H_2$/Ar gas to flow into the reducing system, thereby converting $Au(OH)_3$ into Au. As a result, 80 parts by weight of the gold particles were carried on the surface of 100 parts by weight of the catalyst carrier of $Sr_{0.9}Nd_{0.1}TiO_3$.

Then, the catalyst carrier carrying the gold particles was dispersed in 1,000 mL of water by using a homogenizer and an ultrasonic cleaner so as to prepare a suspension. The suspension thus prepared was put in a four-mouth flask similar to that referred to previously. Then, a precursor solution of ruthenium particles and a precipitant were dripped simultaneously into the suspension while stirring the suspension. Each of the precursor solution of the ruthenium particles and the precipitant was dripped at a rate of 50 mL/hour. The precursor solution of the ruthenium particles was prepared by diluting 2.8 mL of an aqueous solution of chlororuthenic acid containing 42 mg/mL of Ru, with 50 mL of water. On the other hand, 50 mL of an aqueous solution of 0.05M of $NaHCO_3$ was used as the precipitant. In this case, the pH value of the suspension was kept at 3 to 5 during the dripping operation. As a result, the precursor of the ruthenium particles was converted into $Ru(OH)_4$, which was carried on the surfaces of the catalyst carrier and the gold particles.

After the suspension was filtered, the filtrate was dried at 100° C. within a dryer so as to convert $Ru(OH)_4$ into $RuO_2$ so as to obtain a catalyst for the electrode included in a fuel cell, the catalyst comprising 100 parts by weight of the catalyst carrier of $Sr_{0.9}Nd_{0.1}TiO_3$, as well as 80 parts by weight of the gold particles and 20 parts by weight of ruthenium oxide particles, which were carried by the catalyst carrier.

The surface of the catalyst thus obtained was observed with a TEM as in Example 1, as a result of which it has been confirmed that it was possible to obtain a catalyst comprising a catalyst carrier and the gold particles (catalyst particles) carried on the surface of the catalyst carrier. It was also confirmed that ruthenium oxide particles (transition metal oxide particles) were carried on the surface of the catalyst carrier and on the surface of the catalyst particles. The average particle diameter of the gold particles was found to be 2 nm, and the average particle diameter of the catalyst carrier was found to be 100 nm. The CV measurement was applied to the catalyst thus obtained as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

EXAMPLES 44 TO 51

Various catalyst carriers as shown in Table 1 were obtained as in Example 43, except that the kinds of compound A and compound B used were changed as shown in Table 1 for preparing the catalyst carriers and that the mixing ratios of these compounds A and B were changed. The catalyst for the electrode included in the fuel cell was manufactured as in Example 43, except that used was the catalyst carrier thus obtained.

The surface of the catalyst thus obtained was observed with a TEM as in Example 1, as a result of which it has been confirmed that it was possible to obtain a catalyst comprising a catalyst carrier and the gold particles (catalyst particles) carried on the surface of the catalyst carrier. The average particle diameter of the catalyst particles was found to be 2 nm, and the average particle diameter of the catalyst carrier was found to be 100 nm. Also, ruthenium oxide particles (transition metal oxide particles) were found to be carried on the surfaces of the catalyst particles and on the surfaces of the catalyst carriers. The CV measurement was applied to the catalyst thus obtained as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

EXAMPLES 52 TO 56

Various catalyst carriers as shown in Table 1 were obtained as in Example 1, except that used was compound B shown in Table 1 and that the mixing ratio of compound B was changed. The catalysts for the electrode included in the fuel cell were manufactured as in Example 1, except that used were the catalyst carriers thus obtained.

The surface of the catalyst thus obtained was observed with a TEM as in Example 1, as a result of the observation it has been confirmed that gold particles (catalyst particles) were carried on the catalyst carrier. The average particle diameter of the catalyst particles was found to be 2 nm, and the average particle diameter of the catalyst carrier was found to be 100 nm. The CV measurement was applied to the catalyst thus obtained as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

EXAMPLE 57

A suspension containing a catalyst carrier carrying $Au(OH)_3$ that was obtained as in Example 1 was filtered and, then, the filtrate was dried at 50° C. in a dryer, followed by reducing the dried filtrate at 350° C. for one hour while allowing a 95% $H_2$/Ar gas to flow into the reducing system. A catalyst for the electrode included in a fuel cell was manufactured as in Example 1, except that the gold hydroxide $Au(OH)_3$ was converted into Au by the reducing treatment described above. In the catalyst thus manufactured, 100 parts by weight of the gold particles were carried on 100 parts by weight of the catalyst carrier of $Sr_{0.9}Nd_{0.1}TiO_3$.

The surface of the catalyst thus obtained was observed with a TEM as in Example 1, as a result of the observation it has been confirmed that gold particles (catalyst particles) were carried on the surface of the catalyst carrier. The average particle diameter of the catalyst particles was found to be 5 nm, and the average particle diameter of the catalyst carrier was found to be 100 nm. The CV measurement was applied to the catalyst thus obtained as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

EXAMPLE 58

A catalyst carrier as shown in Table 1 was obtained as in Example 1, except that used was compound B shown in Table 1 and that the mixing ratio of compound B was changed. The catalyst for the electrode included in the fuel cell was manufactured as in Example 1, except that used was the catalyst carrier thus obtained and that an aqueous solution of chloroplatinic acid containing 42 mg/mL of Pt was used in place of the aqueous solution of chloroauric acid containing 42 mg/mL of Au. In this catalyst, 100 parts by weight of the platinum particles were carried on 100 parts by weight of the catalyst carrier.

The surface of the catalyst thus obtained was observed with a TEM as in Example 1, as a result of the observation it has been confirmed that it was possible to obtain the catalyst in which platinum particles (catalyst particles) were carried on the surface of the catalyst carrier. The average particle diameter of the catalyst particles was found to be 2 nm, and the average particle diameter of the catalyst carrier was found to be 100 nm. The CV measurement was applied to the catalyst thus obtained as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

EXAMPLE 59

An anode was manufactured as follows.

In the first step, 110 mg of the catalyst obtained in Example 58 and 60 mg of a carbon fiber used as an conductive substance were dispersed in 150 mL of water by using a homogenizer and an ultrasonic cleaner so as to obtain a suspension. The suspension thus obtained was heated and filtered through a electrically conductive porous sheet formed of a carbon paper TGP-H-120 manufactured by Toray Inc. and having an average thickness of 380 μm, followed by drying the filtrate. Then, the electrically conductive porous sheet supporting the dried filtrate was impregnated with an organic solvent prepared by mixing 1-propanol, ethanol and water, and dissolving 4% of a fluorocarbon resin having a sulfonic acid group, i.e., Nafion manufactured by Du Pont Inc., used as a proton conductive material, followed by further allowing the sheet supporting the filtrate to be impregnated with the organic solvent dissolving 6% of Nafion. Then, the organic solvent and water was volatilized so as to manufacture the anode. The electrode thus obtained included a catalyst layer having a thickness of 195 μm. Also, 45 mg of Nafion was found to be contained in the electrode.

In the next step, a fuel cell was assembled as in Example 1, except that the anode thus obtained was used for assembling the fuel cell. The current-voltage characteristics of the fuel cell thus manufactured were measured as in Example 1. Table 1 also shows the maximum output per unit area, covering the case where the air was supplied as the oxidizing agent to the cathode at a flow rate of 120 mL/min.

COMPARATIVE EXAMPLE 1

A catalyst carrier obtained as in Example 1, which did not carry the catalyst particles, was used as the catalyst for the electrode included in a fuel cell.

The CV measurement was applied to the catalyst as in Example 1, except that the sample used was prepared by mixing 200 parts by weight of a carbon paste with 100 parts by weight of the catalyst thus obtained. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The performance of the electromotive section of the fuel cell thus obtained was evaluated like the evaluation in the fuel cell for Example 1. It was impossible to measure the current-voltage characteristics of the fuel cell thus manufactured.

COMPARATIVE EXAMPLE 2

A suspension was prepared by dispersing 1 g of a catalyst carrier consisting of $TiO_2$ manufactured by Nippon Aerosil K.K. (P25, specific surface area of 50 $m^2/g$, average particle diameter of 21 nm) in 1,000 mL of water by using a homogenizer and an ultrasonic cleaner.

The suspension thus prepared was put in a four-mouth flask equipped with a mechanical stirrer, a reflux condenser, and a liquid-circulating pump. Then, 15.8 mL of an aqueous solution of chloroauric acid used as the precursor of gold particles, which contained 42 mg/mL of Au, was put in the flask while stirring the suspension at 80° C., followed by dripping 350 mL of a 0.05 M of an aqueous solution of $NaHCO_3$ used as a precipitant at a rate of 50 mL/hour. After the dripping, the pH value of the suspension was found to be 7.

After the suspension was filtered, the filtrate was dried at 100° C. in a dryer, followed by reducing the filtrate at 300° C. for one hour while allowing a 95% $H_2/Ar$ gas to flow into the reducing system. As a result, $Au(OH)_3$ was reduced into Au so as to obtain a catalyst for the electrode included in a fuel cell. In the catalyst thus manufactured, 67 parts by weight of the gold particles were carried on the surface of 100 parts by weight of the $TiO_2$ carrier.

The surface of the catalyst thus manufactured was observed with a TEM as in Example 1. Gold particles (catalyst particles) were found to be carried on the surface of the catalyst carrier. The average particle diameter of the catalyst particles was found to be 5 nm.

Also, the CV measurement was performed as in Example 1, except that the sample was prepared by mixing 100 parts by weight of a carbon paste with 100 parts by weight of the catalyst thus manufactured. Table 1 also shows the result as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The performance of the electromotive section of the fuel cell thus obtained was evaluated like the evaluation in the fuel cell for Example 1. It was impossible to measure the current-voltage characteristics of the fuel cell thus manufactured.

COMPARATIVE EXAMPLE 3

A catalyst for the electrode included in a fuel cell was manufactured as in Comparative Example 2, except that 1 g of carbon black (Printex L manufactured by Degsa Inc., specific surface area of 150 $m^2/g$, and average particle diameter of 0.023 μm) was used as the catalyst carrier, that 2.38 mL of aqueous solution of chloroauric acid containing 42 mg/mL of Au was used as the precursor of gold particles, and that 100 mL of a 0.03M of aqueous solution of $NaHCO_3$ was used as the precipitant. In the catalyst thus manufactured, 11 parts by weight of gold particles were carried on 100 parts by weight of the carbon black carrier.

The surface of the catalyst thus manufactured was observed with a TEM as in Example 1. The gold particles were found to have been aggregated and found to have been scarcely carried on the surface of the catalyst carrier. The average particle diameter of the aggregate of the gold particles was found to be 15 μm.

The CV measurement was applied to the catalyst thus manufactured as in Example 1. The result of the CV measurement is also shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The performance of the electromotive section of the fuel cell thus obtained was evaluated like the evaluation in the fuel cell for Example 1. It was impossible to measure the current-voltage characteristics of the fuel cell thus manufactured.

COMPARATIVE EXAMPLE 4

A catalyst for the electrode included in a fuel cell was manufactured as in Comparative Example 2, except that $CaTiO_3$ manufactured as described below was used as the catalyst carrier. In this catalyst, 67 parts by weight of gold particles were carried on 100 parts by weight of the $CaTiO_3$ carrier.

To be more specific, the $CaTiO_3$ catalyst carrier was obtained by mixing $CaCO_3$ manufactured by Wako Junyaku Kogyo K.K. with $TiO_2$ manufactured by High Purity Chemical inc. in a stoichiometric ratio, followed by provisionally burning the mixture at 1,300° C. for 10 hours under the air atmosphere, followed by mixing again the burned mixture and subsequently burning formally the mixture for 10 hours so as to obtain the $CaTiO_3$ catalyst carrier.

The surface of the catalyst thus manufactured was observed with a TEM as in Example 1. The gold particles (catalyst particles) were found to be carried on the surface of the catalyst carrier. The average particle diameter of the catalyst particles was found to be 2 nm, and the average particle diameter of the catalyst carriers was found to be 100 nm.

The CV measurement was applied as in Example 1, except that the sample was prepared by mixing 100 parts by weight of a carbon paste with 100 parts by weight of the catalyst thus manufactured. The result is shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The performance of the electromotive section of the fuel cell thus obtained was evaluated like the evaluation in the fuel cell for Example 1. It was impossible to measure the current-voltage characteristics of the fuel cell thus manufactured.

COMPARATIVE EXAMPLE 5

A catalyst for the electrode included in a fuel cell was manufactured as in Comparative Example 2, except that $SrTiO_3$ manufactured as in Example 1 was used as the catalyst carrier. In the catalyst thus manufactured, 67 parts by weight of gold particles were carried on 100 parts by weight of the $SrTiO_3$ catalyst carrier.

The surface of the catalyst thus manufactured was observed with a TEM as in Example 1. The gold particles (catalyst particles) were found to be carried on the surface of the catalyst carrier. The average particle diameter of the catalyst particles was found to be 2 nm, and the average particle diameter of the catalyst carriers was found to be 100 nm.

The CV measurement was applied as in Example 1, except that the sample was prepared by mixing 100 parts by weight of a carbon paste with 100 parts by weight of the catalyst thus manufactured. The result is shown in Table 1 as in Example 1.

In the next step, a cathode was manufactured as in Example 1, except that the catalyst thus obtained was used for manufacturing the cathode. Also, a fuel cell was assembled as in Example 1, except that the cathode thus obtained was used for assembling the fuel cell. The performance of the electromotive section of the fuel cell thus obtained was evaluated like the evaluation in the fuel cell for Example 1. It was impossible to measure the current-voltage characteristics of the fuel cell thus manufactured.

TABLE 1

| | | | Catalyst particles | | | | CV measurement | |
|---|---|---|---|---|---|---|---|---|
| | Compound A Kind | Compound B Kind | Catalyst carrier Kind | Kind | Average particle diameter [nm] | Transition metal oxide Kind | Anode Catalyst carrier Kind | Current value [A] | Maximum output [W/cm$^2$] |
| Example 1 | $SrCO_3$ | $Nd_2O_3$ | $Sr_{0.9}Nd_{0.1}TiO_3$ | Au | 2 | — | Carbon | $7.0 \times 10^{-5}$ | $3.2 \times 10^{-3}$ |
| Example 2 | $SrCO_3$ | $Sm_2O_3$ | $Sr_{0.9}Sm_{0.1}TiO_3$ | Au | 2 | — | Carbon | $7.0 \times 10^{-5}$ | $3.1 \times 10^{-3}$ |
| Example 3 | $SrCO_3$ | $Eu_2O_3$ | $Sr_{0.9}Eu_{0.1}TiO_3$ | Au | 2 | — | Carbon | $6.8 \times 10^{-5}$ | $3.1 \times 10^{-3}$ |
| Example 4 | $SrCO_3$ | $Gd_2O_3$ | $Sr_{0.8}Gd_{0.2}TiO_{2.95}$ | Au | 2 | — | Carbon | $6.9 \times 10^{-5}$ | $3.2 \times 10^{-3}$ |
| Example 5 | $SrCO_3$ | $Dy_2O_3$ | $Sr_{0.8}Dy_{0.2}TiO_3$ | Au | 2 | — | Carbon | $7.0 \times 10^{-5}$ | $3.3 \times 10^{-3}$ |
| Example 6 | $SrCO_3$ | $Ho_2O_3$ | $Sr_{0.8}Ho_{0.2}TiO_3$ | Au | 2 | — | Carbon | $7.2 \times 10^{-5}$ | $3.3 \times 10^{-3}$ |
| Example 7 | $SrCO_3$ | $Er_2O_3$ | $Sr_{0.8}Er_{0.2}TiO_3$ | Au | 2 | — | Carbon | $7.1 \times 10^{-5}$ | $3.2 \times 10^{-3}$ |
| Example 8 | $SrCO_3$ | $Tm_2O_3$ | $Sr_{0.7}Tm_{0.3}TiO_3$ | Au | 2 | — | Carbon | $6.9 \times 10^{-5}$ | $3.3 \times 10^{-3}$ |
| Example 9 | $SrCO_3$ | $Yb_2O_3$ | $Sr_{0.7}Yb_{0.3}TiO_3$ | Au | 2 | — | Carbon | $7.0 \times 10^{-5}$ | $3.3 \times 10^{-3}$ |
| Example 10 | $SrCO_3$ | $Lu_2O_3$ | $Sr_{0.7}Lu_{0.3}TiO_3$ | Au | 2 | — | Carbon | $7.1 \times 10^{-5}$ | $3.2 \times 10^{-3}$ |
| Example 11 | $SrCO_3$ | $La_2O_3$ | $Sr_{0.7}La_{0.3}TiO_3$ | Au | 2 | — | Carbon | $7.1 \times 10^{-5}$ | $3.4 \times 10^{-3}$ |
| Example 12 | $CaCO_3$ | $Nd_2O_3$ | $Ca_{0.9}Nd_{0.1}TiO_{2.7}$ | Au | 2 | — | Carbon | $7.3 \times 10^{-5}$ | $3.1 \times 10^{-3}$ |
| Example 13 | $CaCO_3$ | $Sm_2O_3$ | $Ca_{0.9}Sm_{0.1}TiO_3$ | Au | 2 | — | Carbon | $6.9 \times 10^{-5}$ | $3.0 \times 10^{-3}$ |
| Example 14 | $CaCO_3$ | $Eu_2O_3$ | $Ca_{0.9}Eu_{0.1}TiO_3$ | Au | 2 | — | Carbon | $6.9 \times 10^{-5}$ | $3.1 \times 10^{-3}$ |
| Example 15 | $CaCO_3$ | $Gd_2O_3$ | $Ca_{0.8}Gd_{0.2}TiO_3$ | Au | 2 | — | Carbon | $7.0 \times 10^{-5}$ | $3.1 \times 10^{-3}$ |
| Example 16 | $CaCO_3$ | $Dy_2O_3$ | $Ca_{0.8}Dy_{0.2}TiO_3$ | Au | 2 | — | Carbon | $7.2 \times 10^{-5}$ | $3.2 \times 10^{-3}$ |
| Example 17 | $CaCO_3$ | $Ho_2O_3$ | $Ca_{0.8}Ho_{0.2}TiO_{2.95}$ | Au | 2 | — | Carbon | $7.0 \times 10^{-5}$ | $3.1 \times 10^{-3}$ |
| Example 18 | $CaCO_3$ | $Er_2O_3$ | $Ca_{0.8}Er_{0.2}TiO_3$ | Au | 2 | — | Carbon | $7.0 \times 10^{-5}$ | $3.1 \times 10^{-3}$ |
| Example 19 | $CaCO_3$ | $Tm_2O_3$ | $Ca_{0.7}Tm_{0.3}TiO_3$ | Au | 2 | — | Carbon | $7.1 \times 10^{-5}$ | $3.2 \times 10^{-3}$ |
| Example 20 | $CaCO_3$ | $Yb_2O_3$ | $Ca_{0.7}Yb_{0.3}TiO_3$ | Au | 2 | — | Carbon | $7.2 \times 10^{-5}$ | $3.2 \times 10^{-3}$ |
| Example 21 | $CaCO_3$ | $Lu_2O_3$ | $Ca_{0.7}Lu_{0.3}TiO_3$ | Au | 2 | — | Carbon | $7.2 \times 10^{-5}$ | $3.0 \times 10^{-3}$ |
| Example 22 | $CaCO_3$ | $La_2O_3$ | $Ca_{0.7}La_{0.3}TiO_3$ | Au | 2 | — | Carbon | $7.0 \times 10^{-5}$ | $3.2 \times 10^{-3}$ |
| Example 23 | $BaCO_3$ | $Nd_2O_3$ | $Ba_{0.9}Nd_{0.1}TiO_3$ | Au | 2 | — | Carbon | $6.8 \times 10^{-5}$ | $2.9 \times 10^{-3}$ |
| Example 24 | $BaCO_3$ | $Sm_2O_3$ | $Ba_{0.9}Sm_{0.1}TiO_3$ | Au | 2 | — | Carbon | $6.9 \times 10^{-5}$ | $3.0 \times 10^{-3}$ |
| Example 25 | $BaCO_3$ | $Eu_2O_3$ | $Ba_{0.9}Eu_{0.1}TiO_{2.7}$ | Au | 2 | — | Carbon | $6.8 \times 10^{-5}$ | $2.9 \times 10^{-3}$ |
| Example 26 | $BaCO_3$ | $Gd_2O_3$ | $Ba_{0.8}Gd_{0.2}TiO_3$ | Au | 2 | — | Carbon | $7.1 \times 10^{-5}$ | $3.1 \times 10^{-3}$ |
| Example 27 | $BaCO_3$ | $Dy_2O_3$ | $Ba_{0.8}Dy_{0.2}TiO_3$ | Au | 2 | — | Carbon | $7.0 \times 10^{-5}$ | $3.1 \times 10^{-3}$ |
| Example 28 | $BaCO_3$ | $Ho_2O_3$ | $Ba_{0.8}Ho_{0.2}TiO_3$ | Au | 2 | — | Carbon | $7.0 \times 10^{-5}$ | $3.2 \times 10^{-3}$ |
| Example 29 | $BaCO_3$ | $Er_2O_3$ | $Ba_{0.8}Er_{0.2}TiO_3$ | Au | 2 | — | Carbon | $7.1 \times 10^{-5}$ | $3.1 \times 10^{-3}$ |
| Example 30 | $BaCO_3$ | $Tm_2O_3$ | $Ba_{0.7}Tm_{0.3}TiO_3$ | Au | 2 | — | Carbon | $7.0 \times 10^{-5}$ | $3.2 \times 10^{-3}$ |
| Example 31 | $BaCO_3$ | $Yb_2O_3$ | $Ba_{0.7}Yb_{0.3}TiO_3$ | Au | 2 | — | Carbon | $6.9 \times 10^{-5}$ | $3.3 \times 10^{-3}$ |
| Example 32 | $BaCO_3$ | $Lu_2O_3$ | $Ba_{0.7}Lu_{0.3}TiO_3$ | Au | 2 | — | Carbon | $7.2 \times 10^{-5}$ | $3.0 \times 10^{-3}$ |
| Example 33 | $BaCO_3$ | $La_2O_3$ | $Ba_{0.7}La_{0.3}TiO_{2.9}$ | Au | 2 | — | Carbon | $7.1 \times 10^{-5}$ | $3.3 \times 10^{-3}$ |
| Example 34 | $SrCO_3$ | $Nd_2O_3$ | $Sr_{0.9}Nd_{0.1}TiO_3$ | Au—Pt | 2 | — | Carbon | $7.5 \times 10^{-5}$ | $3.5 \times 10^{-3}$ |
| Example 35 | $SrCO_3$ | $Gd_2O_3$ | $Sr_{0.8}Gd_{0.2}TiO_{2.95}$ | Au—Pt | 2 | — | Carbon | $7.5 \times 10^{-5}$ | $3.4 \times 10^{-3}$ |
| Example 36 | $SrCO_3$ | $La_2O_3$ | $Sr_{0.7}La_{0.3}TiO_3$ | Au—Pt | 2 | — | Carbon | $7.2 \times 10^{-5}$ | $3.6 \times 10^{-3}$ |
| Example 37 | $CaCO_3$ | $Nd_2O_3$ | $Ca_{0.9}Nd_{0.1}TiO_{2.7}$ | Au—Pt | 2 | — | Carbon | $7.3 \times 10^{-5}$ | $3.2 \times 10^{-3}$ |
| Example 38 | $CaCO_3$ | $Gd_2O_3$ | $Ca_{0.8}Gd_{0.2}TiO_3$ | Au—Pt | 2 | — | Carbon | $7.3 \times 10^{-5}$ | $3.3 \times 10^{-3}$ |
| Example 39 | $CaCO_3$ | $La_2O_3$ | $Ca_{0.7}La_{0.3}TiO_3$ | Au—Pt | 2 | — | Carbon | $7.4 \times 10^{-5}$ | $3.5 \times 10^{-3}$ |
| Example 40 | $BaCO_3$ | $Nd_2O_3$ | $Ba_{0.9}Nd_{0.1}TiO_3$ | Au—Pt | 2 | — | Carbon | $7.1 \times 10^{-5}$ | $3.2 \times 10^{-3}$ |
| Example 41 | $BaCO_3$ | $Gd_2O_3$ | $Ba_{0.8}Gd_{0.2}TiO_3$ | Au—Pt | 2 | — | Carbon | $7.2 \times 10^{-5}$ | $3.4 \times 10^{-3}$ |
| Example 42 | $BaCO_3$ | $La_2O_3$ | $Ba_{0.7}La_{0.3}TiO_{2.9}$ | Au—Pt | 2 | — | Carbon | $7.2 \times 10^{-5}$ | $3.5 \times 10^{-3}$ |
| Example 43 | $SrCO_3$ | $Nd_2O_3$ | $Sr_{0.9}Nd_{0.1}TiO_3$ | Au | 2 | $RuO_2$ | Carbon | $7.0 \times 10^{-5}$ | $3.3 \times 10^{-3}$ |
| Example 44 | $SrCO_3$ | $Gd_2O_3$ | $Sr_{0.8}Gd_{0.2}TiO_{2.95}$ | Au | 2 | $RuO_2$ | Carbon | $6.9 \times 10^{-5}$ | $3.2 \times 10^{-3}$ |
| Example 45 | $SrCO_3$ | $La_2O_3$ | $Sr_{0.7}La_{0.3}TiO_3$ | Au | 2 | $RuO_2$ | Carbon | $6.8 \times 10^{-5}$ | $3.4 \times 10^{-3}$ |
| Example 46 | $CaCO_3$ | $Nd_2O_3$ | $Ca_{0.9}Nd_{0.1}TiO_{2.7}$ | Au | 2 | $RuO_2$ | Carbon | $7.0 \times 10^{-5}$ | $3.3 \times 10^{-3}$ |
| Example 47 | $CaCO_3$ | $Gd_2O_3$ | $Ca_{0.7}Gd_{0.3}TiO_3$ | Au | 2 | $RuO_2$ | Carbon | $7.1 \times 10^{-5}$ | $3.5 \times 10^{-3}$ |
| Example 48 | $CaCO_3$ | $La_2O_3$ | $Ca_{0.7}La_{0.3}TiO_3$ | Au | 2 | $RuO_2$ | Carbon | $7.0 \times 10^{-5}$ | $3.2 \times 10^{-3}$ |
| Example 49 | $BaCO_3$ | $Nd_2O_3$ | $Ba_{0.9}Nd_{0.1}TiO_3$ | Au | 2 | $RuO_2$ | Carbon | $6.9 \times 10^{-5}$ | $3.3 \times 10^{-3}$ |
| Example 50 | $BaCO_3$ | $Gd_2O_3$ | $Ba_{0.8}Gd_{0.2}TiO_3$ | Au | 2 | $RuO_2$ | Carbon | $7.2 \times 10^{-5}$ | $3.3 \times 10^{-3}$ |
| Example 51 | $BaCO_3$ | $La_2O_3$ | $Ba_{0.7}La_{0.3}TiO_{2.9}$ | Au | 2 | $RuO_2$ | Carbon | $7.1 \times 10^{-5}$ | $3.4 \times 10^{-3}$ |
| Example 52 | $SrCO_3$ | $La_2O_3$ | $Sr_{0.5}La_{0.5}TiO_{2.9}$ | Au | 2 | — | Carbon | $7.0 \times 10^{-5}$ | $3.2 \times 10^{-3}$ |
| Example 53 | $SrCO_3$ | $La_2O_3$ | $Sr_{0.3}La_{0.7}TiO_3$ | Au | 2 | — | Carbon | $6.9 \times 10^{-5}$ | $3.3 \times 10^{-3}$ |
| Example 54 | $SrCO_3$ | $La_2O_3$ | $Sr_{0.1}La_{0.9}TiO_3$ | Au | 2 | — | Carbon | $7.0 \times 10^{-5}$ | $3.2 \times 10^{-3}$ |
| Example 55 | $SrCO_3$ | $La_2O_3$ | $Sr_{0.05}La_{0.95}TiO_3$ | Au | 2 | — | Carbon | $6.7 \times 10^{-5}$ | $2.9 \times 10^{-3}$ |
| Example 56 | $SrCO_3$ | $La_2O_3$ | $Sr_{0.95}La_{0.05}TiO_3$ | Au | 2 | — | Carbon | $6.7 \times 10^{-5}$ | $2.7 \times 10^{-3}$ |
| Example 57 | $SrCO_3$ | $Nd_2O_3$ | $Sr_{0.9}Nd_{0.1}TiO_3$ | Au | 5 | — | Carbon | $6.0 \times 10^{-5}$ | $2.8 \times 10^{-3}$ |
| Example 58 | $SrCO_3$ | $La_2O_3$ | $Sr_{0.7}La_{0.3}TiO_3$ | Pt | 2 | — | Carbon | $9.0 \times 10^{-5}$ | $6.1 \times 10^{-3}$ |
| Example 59 | $SrCO_3$ | $Nd_2O_3$ | $Sr_{0.9}Nd_{0.1}TiO_3$ | Au | 2 | — | $Sr_{0.7}La_{0.3}TiO_3$ | $7.1 \times 10^{-5}$ | $3.4 \times 10^{-3}$ |
| Comparative Example 1 | $SrCO_3$ | $Nd_2O_3$ | $Sr_{0.9}Nd_{0.1}TiO_3$ | — | — | — | Carbon | $4.0 \times 10^{-6}$ | Impossible to measure |

TABLE 1-continued

| | Compound A Kind | Compound B Kind | Catalyst carrier Kind | Catalyst particles Kind | Average particle diameter [nm] | Transition metal oxide Kind | Anode Catalyst carrier Kind | CV measurement Current value [A] | Maximum output [W/cm$^2$] |
|---|---|---|---|---|---|---|---|---|---|
| Comparative Example 2 | — | — | TiO$_2$ | Au | 5 | — | Carbon | 3.3 × 10$^{-5}$ | Impossible to measure |
| Comparative Example 3 | — | — | carbon | Au | 15 | — | Carbon | 1.2 × 10$^{-6}$ | Impossible to measure |
| Comparative Example 4 | — | — | CaTiO$_3$ | Au | 2 | — | Carbon | 3.5 × 10$^{-5}$ | Impossible to measure |
| Comparative Example 5 | — | — | SrTiO$_3$ | Au | 2 | — | Carbon | 3.6 × 10$^{-5}$ | Impossible to measure |

The catalyst used in each of Examples 1 to 59 comprises catalyst particles containing at least one component selected from the group consisting of gold, platinum and an gold alloy, the gold alloy containing gold and at least one element selected from transition metal elements of the fourth period, fifth period and sixth period of the Periodic Table, and a catalyst carrier containing a perovskite type oxide represented by formula (1) given previously and carrying the catalyst particles. As is apparent from Table 1, the catalyst used in each of Examples 1 to 59 was found to exhibit a high current value obtained by the CV measurement and an excellent oxygen reducing activity. Also, the fuel cell using the catalyst for each of Examples 1 to 59 was found to exhibit a high maximum output and an excellent power generation efficiency.

Further, in the fuel cell for each of Examples 11, and 53 to 55, the catalyst carrier was formed of a perovskite type oxide in which Sr was used as the element A, La was used as the element B, and the molar ratio x in formula (1) fell within a range of not smaller than 0.1 to not larger than 0.95. The fuel cell for Example 56 was equal to the fuel cell for each of Examples 11 and 53 to 55 in the elements A and B of the perovskite type oxide used as the catalyst carrier. However, the molar ratio x in formula (1) representing the perovskite type oxide failed to fall within the range noted above in the fuel cell for Example 56. As is apparent from Table 1, the fuel cell for each of Examples 11 and 53 to 55 was found to be superior to the fuel cell for Example 56 in the output characteristics. It is considered reasonable to understand that it is possible to improve the electric conductivity of the perovskite type oxide catalyst carrier if the molar ratio x falls within a range of not smaller than 0.1 to not larger than 0.95.

Further, in the fuel cell for each of Examples 11, 53 and 54, the catalyst carrier was formed of a perovskite type oxide in which the molar ratio x in formula (1) fell within a range of not smaller than 0.1 to not larger than 0.9. In the fuel cell for Example 55, however, the molar ratio x of formula (1) representing the perovskite type oxide catalyst carrier failed to fall within the range given above. In this case, the fuel cell for each of Examples 11, 53 and 54 was found to be superior to the fuel cell for Example 55 in the output characteristics.

Also, in the catalyst used in Example 1, the catalyst particles had an average particle diameter of 2 nm. On the other hand, in the catalyst used in Example 57, the catalyst particles had an average particle diameter of 5 nm. The experimental data for Examples 1 and 57 given in Table 1 clearly support that the catalyst in which the catalyst carrier carries catalyst particles having a smaller average particle diameter permits further improving the catalytic activity.

Further, the experimental data for Example 59 support that the catalyst of the embodiment of the present invention is capable of effectively performing the function of the anode catalyst.

On the other hand, the oxygen reducing activity of the catalyst for each of Comparative Examples 1 to 5 was found to be lower than that of the catalyst for each of Examples 1 to 58. Further, when it comes to the fuel cell using the catalyst for each of Comparative Examples 1 to 5, it was impossible to measure the current-voltage characteristics corresponding to those of the fuel cell for Example 1, which are shown in FIG. 5. It should be noted in this connection that a catalyst carrier not carrying catalyst particles was used in Comparative Example 1 as the catalyst. On the other hand, carbon was used as the catalyst carrier in Comparative Example 3 and, thus, it was impossible for gold particles to be carried by the catalyst carrier sufficiently. It is considered reasonable to understand that, because of the situation given above, a sufficient catalytic activity was not obtained in the fuel cell using the catalyst for each of Comparative Examples 1 and 3, so that the power generation efficiency deteriorated, with the result that it was impossible to measure the maximum output.

In Comparative Example 2, TiO$_2$ exemplified as a catalyst carrier in Jpn. Pat. Appln. KOKAI Publication No. 7-8797 referred to previously was used as the catalyst carrier. In this case, it is considered reasonable to understand that the catalyst carrier formed of TiO$_2$ was not electrically conductive, so that the fuel cell resistance increased markedly and, thus, the power generation efficiency deteriorated, with the result that it was impossible to measure the maximum output.

Still further, CaTiO$_3$ and SrTiO$_3$, which are oxides containing the element A alone (the element B being not contained) and which are exemplified as the catalyst carriers in Jpn. Pat. Appln. KOKAI Publication No. 7-8797 referred to above, were used in Comparative Examples 4 and 5, respectively. In these Comparative Examples, the electric conductivity of the catalyst carrier was very low or the catalyst carrier was substantially non-conductive. It is considered reasonable to understand that, since such a catalyst carrier was used for manufacturing the catalyst, the resistance of the fuel cell was markedly increased in each of Comparative Examples 4 and 5, so that the power generation efficiency deteriorated, with the result that it was impossible to measure the maximum output.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A fuel cell, comprising:
a cathode comprising a cathode catalyst layer, wherein said cathode is in contact with an oxidizing agent;
an anode comprising an anode catalyst layer, wherein said anode is in contact with a fuel; and
a proton conductive membrane arranged between the cathode and the anode, wherein the cathode catalyst layer comprises a cathode catalyst, comprising:
a cathode catalyst particle comprising at least one component selected from the group consisting of gold and a gold alloy, the gold alloy comprising gold and at least one element selected from the transition metal elements of the fourth period, fifth period and sixth period of the Periodic Table; and
a cathode catalyst carrier carrying the cathode catalyst particle and comprising a perovskite type oxide represented by formula (1):

$$A_{(1-x)}B_xTiO_y \qquad (1)$$

where the element A is at least one element selected from the group consisting of Ca, Sr and Ba, the element B is at least one element selected from the group consisting of La, Nd, Sm, Eu, Gd, Dy, Ho, Er, Tm, Yb, and Lu, the molar ratio x satisfies $0<x<1$, and the molar ratio y satisfies $2.7 \leq y \leq 3$.

2. The fuel cell according to claim 1, wherein the cathode catalyst further comprises particles of an oxide of at least one element selected from the transition metal elements of the fourth period, the fifth period, and the sixth period of the Periodic Table, said particles of an oxide being carried on at least one of the cathode catalyst particle and the cathode catalyst carrier.

3. The fuel cell according to claim 1, wherein the cathode catalyst particle has an average particle diameter not larger than 5 nm.

4. The fuel cell according to claim 1, wherein the cathode catalyst carrier has an average particle diameter of 10 nm to 1 μm.

5. The fuel cell according to claim 1, wherein the cathode catalyst particle has an average particle diameter of 0.2 nm to 3 nm.

6. The fuel cell according to claim 1, wherein the cathode catalyst further comprises particles of an oxide of at least one element selected from the group consisting of Mn, Co, Zr, Mo, Ru, W and Ir, said particles of an oxide being carried on at least one of the cathode catalyst particle and the cathode catalyst carrier.

7. The fuel cell according to claim 1, wherein the gold alloy comprises at least one element selected from the group consisting of Pt, Ru, Ir, Mo, Fe, Co, Ni, W, Sn and Re.

8. The fuel cell according to claim 1, wherein the gold alloy comprises the gold element in an amount of 50% to 99% by weight based on the amount of the gold alloy.

9. The fuel cell according to claim 1, wherein the anode catalyst layer comprises an anode catalyst comprising:
an anode catalyst particle comprising at least one of platinum and ruthenium, and an anode catalyst carrier carrying the anode catalyst particle and comprising a carbon material.

* * * * *